(12) United States Patent
Kedem et al.

(10) Patent No.: US 10,642,637 B2
(45) Date of Patent: *May 5, 2020

(54) METHODS AND APPARATUS FOR PROVIDING HYPERVISOR LEVEL DATA SERVICES FOR SERVER VIRTUALIZATION

(71) Applicant: Zerto Ltd., Herzilya (IL)

(72) Inventors: Ziv Kedem, Tel Aviv (IL); Gil Levonai, Tel Aviv (IL); Yair Kuszpet, Netanya (IL); Chen Yehezkel Burshan, Tel Aviv (IL)

(73) Assignee: Zerto Ltd., Herzilya (IL)

( * ) Notice: Subject to any disclaimer, the term of this patent is extended or adjusted under 35 U.S.C. 154(b) by 0 days.

This patent is subject to a terminal disclaimer.

(21) Appl. No.: 14/831,623

(22) Filed: Aug. 20, 2015

(65) Prior Publication Data

US 2016/0034296 A1    Feb. 4, 2016

Related U.S. Application Data

(63) Continuation of application No. 13/175,898, filed on Jul. 4, 2011, now Pat. No. 9,710,294, which is a
(Continued)

(51) Int. Cl.
*G06F 15/173*    (2006.01)
*G06F 9/455*    (2018.01)
*H04L 12/24*    (2006.01)

(52) U.S. Cl.
CPC .......... *G06F 9/45558* (2013.01); *H04L 41/12* (2013.01); *G06F 2009/45579* (2013.01); *G06F 2009/45595* (2013.01)

(58) Field of Classification Search
None
See application file for complete search history.

(56) References Cited

U.S. PATENT DOCUMENTS 5,212,784 A    5/1993 Sparks
5,544,347 A    8/1996 Yanai et al.
(Continued)

FOREIGN PATENT DOCUMENTS

WO    WO-2009/151445    12/2009

OTHER PUBLICATIONS

U.S. Office Action on U.S. Appl. No. 14/687,341 dated Mar. 3, 2016.
(Continued)

*Primary Examiner* — Mohamed Ibrahim
(74) *Attorney, Agent, or Firm* — Foley & Lardner LLP; James De Vellis

(57) ABSTRACT

A system for cloud-based data services for multiple enterprises, including a plurality of cloud hypervisors that cooperatively provide cloud-based services to multiple enterprises, each hypervisor including a plurality of cloud virtual servers, each cloud virtual server being associated with an enterprise, at least one cloud virtual disk that is read from and written to by the at least one virtual server, each cloud virtual disk being associated with an enterprise, and a virtual data services appliance, which provides cloud-based data services, and multiple data services managers, one data services manager per respective enterprise, each of which coordinates the respective virtual data services appliances for those cloud hypervisors that service its corresponding enterprise.

19 Claims, 11 Drawing Sheets

Related U.S. Application Data continuation of application No. 13/039,446, filed on Mar. 3, 2011.

(60) Provisional application No. 61/314,589, filed on Mar. 17, 2010.

(56) References Cited

U.S. PATENT DOCUMENTS

| | | | |
|---|---|---|---|
| 5,649,152 | A | 7/1997 | Ohran et al. |
| 5,664,186 | A | 9/1997 | Bennett et al. |
| 5,835,953 | A | 11/1998 | Ohran |
| 5,933,653 | A | 8/1999 | Ofek |
| 5,935,260 | A | 8/1999 | Ofer |
| 5,991,813 | A | 11/1999 | Zarrow |
| 6,073,209 | A | 6/2000 | Bergsten |
| 6,073,222 | A | 6/2000 | Ohran |
| 6,658,591 | B1 | 12/2003 | Arndt |
| 6,910,160 | B2 | 6/2005 | Bajoria et al. |
| 6,944,847 | B2 | 9/2005 | Desai et al. |
| 7,063,395 | B2 | 6/2006 | Gagne et al. |
| 7,143,307 | B1 | 11/2006 | Witte et al. |
| 7,325,159 | B2 | 1/2008 | Stager et al. |
| 7,421,617 | B2 | 9/2008 | Anderson et al. |
| 7,464,126 | B2 | 12/2008 | Chen |
| 7,475,207 | B2 | 1/2009 | Bromling et al. |
| 7,516,287 | B2 | 4/2009 | Ahal et al. |
| 7,523,277 | B1 | 4/2009 | Kekre et al. |
| 7,557,867 | B2 | 7/2009 | Goo |
| 7,577,817 | B2 | 8/2009 | Karpoff et al. |
| 7,577,867 | B2 | 8/2009 | Lewin et al. |
| 7,603,395 | B1 | 10/2009 | Bingham et al. |
| 7,647,460 | B1 | 1/2010 | Wilson et al. |
| 7,720,817 | B2 | 5/2010 | Stager et al. |
| 7,765,433 | B1 | 7/2010 | Krishnamurthy |
| 7,791,091 | B2 | 9/2010 | Nagai |
| 7,849,361 | B2 | 12/2010 | Anal et al. |
| 7,865,893 | B1 | 1/2011 | Omelyanchuk et al. |
| 7,971,091 | B1 | 6/2011 | Bingham et al. |
| 8,020,037 | B1 | 9/2011 | Schwartz et al. |
| 8,156,301 | B1 | 4/2012 | Khandelwal et al. |
| 8,296,419 | B1* | 10/2012 | Khanna ............ G06F 9/5072 709/201 |
| 8,352,941 | B1 | 1/2013 | Protopopov et al. |
| 8,650,299 | B1 | 2/2014 | Huang et al. |
| 2003/0149910 | A1 | 8/2003 | Qin et al. |
| 2004/0068561 | A1 | 4/2004 | Yamamoto et al. |
| 2004/0153639 | A1 | 8/2004 | Cherian et al. |
| 2005/0071588 | A1 | 3/2005 | Spear et al. |
| 2005/0171979 | A1 | 8/2005 | Stager et al. |
| 2005/0182953 | A1 | 8/2005 | Stager et al. |
| 2005/0188256 | A1 | 8/2005 | Stager et al. |
| 2006/0047996 | A1 | 3/2006 | Anderson et al. |
| 2006/0048002 | A1 | 3/2006 | Kodi et al. |
| 2006/0112222 | A1 | 5/2006 | Barrall |
| 2006/0129562 | A1 | 6/2006 | Pulamarasetti et al. |
| 2006/0161394 | A1 | 7/2006 | Dulberg et al. |
| 2007/0028244 | A1 | 2/2007 | Landis et al. |
| 2007/0112772 | A1 | 5/2007 | Morgan et al. |
| 2007/0162513 | A1 | 7/2007 | Lewin et al. |
| 2007/0220311 | A1 | 9/2007 | Lewin et al. |
| 2008/0086726 | A1 | 4/2008 | Griffith et al. |
| 2008/0177963 | A1 | 7/2008 | Rogers |
| 2008/0195624 | A1 | 8/2008 | Ponnappan et al. |
| 2008/0208555 | A1 | 8/2008 | Tatsuoka et al. |
| 2009/0150510 | A1 | 6/2009 | Kovacs et al. |
| 2009/0187776 | A1 | 7/2009 | Baba et al. |
| 2009/0249330 | A1 | 10/2009 | Abercrombie et al. |
| 2009/0283851 | A1 | 11/2009 | Chen |
| 2009/0307396 | A1* | 12/2009 | Nogueras ............ G06F 9/541 710/65 |
| 2010/0017801 | A1 | 1/2010 | Kundapur |
| 2010/0027552 | A1* | 2/2010 | Hill ............ H04L 12/66 370/401 |
| 2010/0058335 | A1* | 3/2010 | Weber ............ G06F 9/45558 718/1 |
| 2010/0150341 | A1 | 6/2010 | Dodgson et al. |
| 2010/0175064 | A1 | 7/2010 | Brahmaroutu |
| 2010/0198972 | A1 | 8/2010 | Umbehocker |
| 2010/0250824 | A1 | 9/2010 | Belay |
| 2010/0250892 | A1 | 9/2010 | Logan et al. |
| 2010/0274886 | A1 | 10/2010 | Nahum et al. |
| 2010/0274890 | A1* | 10/2010 | Patel ............ G06F 9/4862 709/224 |
| 2011/0022812 | A1 | 1/2011 | Van Der Linden et al. |
| 2011/0055471 | A1 | 3/2011 | Thatcher et al. |
| 2011/0075674 | A1 | 3/2011 | Li et al. |
| 2011/0087874 | A1 | 4/2011 | Timashev et al. |
| 2011/0099200 | A1 | 4/2011 | Blount et al. |
| 2011/0099342 | A1 | 4/2011 | Ozdemir |
| 2011/0107331 | A1* | 5/2011 | Evans ............ H04W 4/003 718/1 |
| 2011/0125980 | A1 | 5/2011 | Brunet et al. |
| 2011/0131183 | A1 | 6/2011 | Chandhok et al. |
| 2011/0153569 | A1 | 6/2011 | Fachan et al. |
| 2011/0161299 | A1 | 6/2011 | Prahlad et al. |
| 2011/0161301 | A1 | 6/2011 | Pratt et al. |
| 2011/0179341 | A1 | 7/2011 | Falls et al. |
| 2011/0202734 | A1 | 8/2011 | Dhakras et al. |
| 2011/0264786 | A1 | 10/2011 | Kedem et al. |
| 2012/0110086 | A1 | 5/2012 | Baitinger et al. |
| 2012/0110572 | A1 | 5/2012 | Kodi et al. |
| 2012/0185913 | A1 | 7/2012 | Martinez et al. |
| 2013/0014104 | A1 | 1/2013 | Natanzon et al. |
| 2014/0331221 | A1 | 11/2014 | Dong et al. |

OTHER PUBLICATIONS

U.S. Final Office Action on U.S. Appl. No. 13/175,892 dated Apr. 8, 2016.
U.S. Notice of Allowance on U.S. Appl. No. 13/367,456 dated May 11, 2016.
Notice of Allowance on U.S. Appl. No. 13/367,448 dated Jul. 28, 2016.
Notice of Allowance on U.S. Appl. No. 14/687,341 dated Aug. 18, 2016.
Office Action on U.S. Appl. No. 13/175,898 dated Jul. 7, 2016.
"Zerto Hits Triple-Digit Growth Once Again, Builds Toward a Future of Uninterrupted Technology," Zerto, Feb. 3, 2015, 2 pages.
A Comparison of Hypervisor-based Replication vs. Current and Legacy BC/DR Technologies, 2012.
Amendment "B" and Response to Office Action from Prosecution History of U.S. Pat. No. 7,603,395, dated Apr. 9, 2009, (13 pages).
Amendment "E" and Response to Office Action from Prosecution History of U.S. Pat. No. 7,971,091., dated Nov. 19, 2010, (14 pages).
Amendment and Response to Office Action from Prosecution History of U.S. Pat. No. 7,647,460, dated Aug. 30, 1999 (22 pages).
Answer Claim Construction Brief of Plaintiffs *EMC Corporation and EMC Israel Development Center, Ltd., EMC Corporation and EMC Israel Development Center, Ltd., v. Zerto, Inc.*, Case No. 12-956(GMS), May 9, 2014, (24 pages).
Appellants' Brief Pursuant to 37 C.F.R section 1.192 from Prosecution History of U.S. Pat. No. 7,647,460., May 9, 2002, (34 pages).
Choosing a VSS Provider Veeam Backup Guide for HyperV, Mar. 18, 2015.
Complaint, *EMC Corporation and Emc Israel Development Center, Ltd., v. Zerto, Inc.*, Case No., Demand for Jury Trial, Jul. 20, 2012, (13 pages).
Data Loss Avoidance: Near Continuous Data Protection and Streamlined Disaster Recovery, www.veeam.com.
Defendant Zerto, Inc.'s Amended Answer to the First Amended Complaint, Affirmative Defense, and Counterclaims, *EMC Corporation and EMC Israel Development Center, Ltd., v. Zerto, Inc.*, Case No. 12-956-GMS, Aug. 7, 2014, (34 pages).
Defendant Zerto, Inc.'s Claim Construction Answering Brief, *EMC Corporation and EMC Israel Development Center, Ltd., v. Zerto, Inc.*, Case No. 12-956 (GMS), May 9, 2014, (23 pages).

(56) References Cited

OTHER PUBLICATIONS

Defendant Zerto, Inc.'s Opening Brief in Support of its Motion for Leave to Amend its Answer to the First Amended Complaint, Affirmative Defense and Counterclaims, *EMC Corporation and EMC Israel Development Center, Ltd., v. Zerto, Inc.*, Case No. 12-956-GMS, Jun. 6, 2014, (24 pages).
Defendant Zerto, Inc.'s Opening Claim Construction Brief., *EMC Corporation and EMC Israel Development Center, Ltd., v. Zerto, Inc.*, Case No. 12-956(GMS), Apr. 11, 2014, (26 pages).
Defendant Zerto, Inc.'s Reply Brief in Support of its Motion for Leave to Amend its Answer to the First Amended Compliant, Affirmative Defense and Counterclaims, *EMC Corporation and EMC Israel Development Center, Ltd., v. Zerto, Inc.*, Case No. 12-956-GMS, Jul. 9, 2014, (16 pages).
Defendant Zerto, Inc's Motion for Judgment as a Matter of Law of No Willful Infringement of the '867 Patent . . . , Apr. 30, 2015.
Defendant's Answering Brief in Opposition to Plaintiffs' Motion to Strike and Dismiss Defendant's Affirmative Defense and Counterclaims of "Invalidity" based on Assignor Estoppel, *EMC Corporation and EMC Israel Development Center, Ltd., v. Zerto, Inc.*, Case No. 12-956(GMS), Nov. 5, 2012, (21 pages).
Deploy Hyper-V Replica, published May 31, 2012.
Double-Take Availability for vSphere: Technical Data Sheet, 2014.
EMC Corporation and EMC Israel Development Center, Ltd.'s Answer to the Amended Counterclaims of Zerto Inc., *EMC Corporation and EMC Israel Development Center, Ltd., v. Zerto, Inc.*, Case No. 12956-GMS, Aug. 25, 2014, (12 pages).
EMC Recoverpoint Family, 2012.
EMC Recoverpoint for Virtual Machines: Protects and Recovers VMs to Any Point in Time, 2012.
EMC's Answer Brief in Opposition to Zerto's Motion for Judgment on the Pleadings on Count III o fthe First Amended Complaint, *EMC Corporation and EMC Israel Development Center, Ltd., v. Zerto, Inc.*, Case No. 12-956-GMS, Aug. 11, 2014, (25 pages).
EMC's Answering Brief in Opposition of Zerto's Renewed Motion for Judgment as a Matter of Law or, in the Alternative, for a New Trial, Jul. 17, 2015.
EMC's Answering Brief in Opposition to Zerto's Motion for a New Trial and to Alter or Amend the Judgment, due to an Inconsistent Verdict, Jul. 17, 2015.
EMC's Answering Brief in Opposition to Zerto's Motion for Leave to Amend its Answer to the First Amended Complaint by Adding an Inequitable Conduct Defense and Counterclaims, *EMC Corporation and EMC Israel Development Center, Ltd., v. Zerto, Inc.*, Case No. 12-956-GMS, Jun. 23, 2014 (25 pages).
EMC's Opening Brief in Support of Its Motion for an Accounting and to Amend the Judgment, Jun. 24, 2015.
EMC's Opening Brief in Support of Its Renewed Motion for Judgment as a Matter of Law, Jun. 5, 2015.
Failed to Create a Quiesced Snapshot of a VM, Nov. 5, 2014, http://nakivo.com.
Features Nakivo Backup and Replication, accessed Jul. 7, 2015, http:www/nakivo.com/VMware-VM-backup-replication-features.htm.
FreezeFrame User's Guide, Version 1.1, Document Version 1.1, 60 pgs, Nov. 1993.
Harper Collins, Collins English Dictionary, Third Edition Updated 1994, Section JA-258-260(3 pages).
HP 3PAR Remote Copy Software User Guide HP 3PAR OS 3.2.1 MU2, copyright 2009.
HP 3PAR Remote Copy Software, 2015, www.hp.com.
Hyper-V Replica Feature Overview, published Feb. 29, 2012.
Illuminata EMC RecoverPoint: Beyond Basics CDP Searched via internet on Nov. 10, 2013.
Is Synchronous Replication Enough, May 29, 2013, http://www.zerto.com/blog/general/is-synchronous-replication-enough.
Joint Appendix of Intrinsic and Dictionary Evidence, *EMC Corporation and EMC Israel Development Center, Ltd., v. Zerto, Inc.*, Case No. 12-956-GMS, May 12, 2014, (366 pages).
Joint Claim Construction Chart, *EMC Corporation and EMC Israel Development Center, Ltd., v. Zerto, Inc.*, Case No. 12-956(GMS), Mar. 21, 2014, (24 pages).
Judgment, May 21, 2015.
Letter regarding EMC's Request to File Summary Judgment Motions—Redacted, dated Feb. 13, 2015, 120 pages.
Letter to Judge Sleet re. *EMC Corporation v. Zerto, Inc.*, Feb. 6, 2015.
Managing VM Data with Tintri, Phillips, John, 2013.
Memorandum, *EMC Corporation and EMC Israel Development Center, Ltd., v. Zerto, Inc.*, Case No. 12-956-GMS, Jul. 31, 2014 (8 pages).
Mendocino: The RecoveryOne Solution, Architecture Guide, 22 pages Product Version 1.0, Jan. 3, 2006.
Merriam-Webster, Inc., Webster's Third New International Dictionary, Section JA-276-279 (4 pages) Copyright 2002.
Metro Mirror and Global Mirror.
Microsoft Press, Microsoft Computer Dictionary, Fifth Edition, Section JA-341-343, Page. 296 (4 pages) 2002.
NetWorker PowerSnap Module for EMC Symmetrix, Release 2.1 Installation and Administrator's Guide, 238 pgs, printed Sep. 2005.
Notice of Allowance dated Apr. 3, 2015 for U.S. Appl. No. 13/175,892.
Notice of Allowance dated Jul. 16, 2015 for U.S. Appl. No. 13/175,898.
Notice of Allowance for U.S. Appl. No. 13/175,892 dated Dec. 23, 2014.
Notification Concerning Transmittal of International Preliminary Report on Patentability dated Jan. 7, 2014 in corresponding PCT Application No. PCT/IL2012/000271, 12 pages.
Olzak, T., "Secure hypervisor-based virtual server environments", Feb. 26, 2007. http://www.techrepublic.com/blog/security/secure-hypervisor-based-virtual-server-environments/160.
Opening Brief in Support of Defendant Zerto, Inc.'s Motion for Judgment on the Pleadings on Count III of the First Amended Compliant, *EMC Corporation and EMC Israel Development Center, Ltd., v. Zerto, Inc.*, Case No. 12-956-GMS, Jul. 25, 2014, (19 pages).
Order Construing the Terms of U.S. Pat. No. 7,647,460; U.S. Pat. No. 6,073,222; U.S. Pat. No. 7,603,395; U.S. Pat. No. 7,971,091; and U.S. Pat. No. 7,577,867, *EMC Corporation and EMC Israel Development Center, Ltd., v. Zerto, Inc.*, Case No. 12-956-GMS, Sep. 5, 2014, (0 pages).
Plaintiffs EMC Corporation and Emc Israel Development Center, Ltd.'s Opening Claim Construction Brief, *EMC Corporation and EMC Israel Development Center, Ltd.,v. Zerto, Inc.*, Case No. 12-956(GMS), Apr. 11, 2014, (26 pages).
Plaintiff's Motion for Judgment As a Matter of Law Pursuant to Fed. R. Civ. P. 50(a), May 6, 2015.
Plaintiffs' Opening Brief in Support of their Motion to Strike and Dismiss Defendant's Affirmative Defense and Counterclaims of "Invalidity" Based on Assignor Estoppel, *EMC Corporation and EMC Israel Development Center, Ltd., v. Zerto, Inc.*, Case No. 12-956(GMS), Oct. 4, 2012, (18 pages).
Reference Model for Open Storage Systems Interconnection, Mass Storage System Reference Model Version 5, Sep. 1994 (36 pages).
ReplicateVM, Replicate VMs, not Luns, Jul. 7, 2015, http://www.tintri.com/producs/replicatevm.
Report on the Filing or Determination of an Action Regarding a Patent or Trademark, May 22, 2015.
Revised Joint Claim Construction Chart, *EMC Corporation and EMC Israel Development Center, Ltd., v. Zerto, Inc.*, Case No. 12-956(GMS), Apr. 11, 2014, (19 pages).
Revised Joint Claim Construction Chart, *EMC Corporation and EMC Israel Development Center, Ltd., v. Zerto, Inc.*, Case No. 12-956(GMS), Jun. 6, 2014, (19 pages).
Scalable, High-Performance, and Cost-Effective Remote Replication on Hitachi Unified Storage and Brocade Extension Platforms, 2012, www.brocade.com.
Storage Networking Industry Association Dictionary, http://web.archive.org/web20060220153102/http://www.snia.org/education/dictionary/a, pp. JA-261-JA-273 (13 pages) 2006.
Tech Target Search., http://searchstorage.techtarget.com/definition/storage-snapshot.html, (p. JA-274) Jul. 2005.

(56) References Cited

OTHER PUBLICATIONS

The Kashya KB 4000 Administrator's User Guide Product Release 2.0, 105 pgs, Aug. 2004.
The RecoveryONE Solution, Architecture Guide, Product Version 1.0, 22 pgs, Jan. 2006.
Transcript of Markman Hearing, *EMC Corporation and EMC Israel Development Center, Ltd.*, v. *Zerto, Inc.*, Case No. 12-956-GMS, Jun. 25, 2014 (94 pgs).
U.S. Final Office Action dated Dec. 30, 2013 in related U.S. Appl. No. 13/039,446, filed Mar. 3, 2011, 10 pages.
U.S. Final Office Action dated Feb. 13, 2014 in related U.S. Appl. No. 13/367,448, filed Feb. 7, 2012.
U.S. Non-Final Office Action dated Apr. 26, 2013 in related U.S. Appl. No. 13/367,448, filed Feb. 7, 2012,19 pages.
U.S. Non-Final Office Action dated Jun. 21, 2013 in related U.S. Appl. No. 13/175,892, filed Jul. 4, 2011, 15 pages.
U.S. Non-Final Office Action dated Jun. 6, 2013 in related U.S. Appl. No. 13/039,446, filed Mar. 3, 2011, 12 pages.
U.S. Office Action for U.S. Appl. No. 13/039,446 dated Mar. 4, 2013 (13 pages).
Unitrends Enterprise Backup Software and Solutions, 2015, http://www.unitrends.com/products/enterprise-backup-software/unitrends-enterprise-backup.
Unitrends Release 7.3 Beta Now Available, Nov. 26, 2013, http://blogs.unitrends.com/unitrends-release-7-3-beta-now-available/.
U.S. Office Action dated Apr. 18, 2014 in related U.S. Appl. No. 13/175,892, filed Jul. 4, 2011.
U.S. Office Action dated Jul. 17, 2014 in related U.S. Appl. No. 13/175,898 filed Jul. 7, 2011.
U.S. Office Action on U.S. Appl. No. 13/039,446 dated Sep. 1, 2015.
U.S. Office Action on U.S. Appl. No. 13/367,448 dated Feb. 3, 2015.
U.S. Office Action on U.S. Appl. No. 13/175,892 dated Sep. 1, 2015.
U.S. Office Action on U.S. Appl. No. 13/367,456 dated Oct. 1, 2015.
U.S. Office Action on U.S. Appl. No. 12/175,892 dated Sep. 11, 2015.
U.S. Office Action on U.S. Appl. No. 13/039,446 dated Jan. 2, 2015.
U.S. Office Action on U.S. Appl. No. 13/175,898 dated Mar. 25, 2015.
Using Double-Take Software and the Virtual Recovery Appliance, http://www.discoposse.com/index.php/category/technology/.
Veeam Backup and Replication v8, www.veeam.com.
VMware ESXi and ESX Replication for Simple Fast Disaster Recovery, http://software.dell.com/products/vreplicator/.
VMware vCenter Site Recovery Manager5 with vSphere Replication, 2011.
VMware vSphere Replication 6.0, Apr. 2015.
vReplicator Version 3.0, 2009.
Warrick, et al, "IBM Total Storage Enterprise Storage Server Implementing ESS Copy Services in Open Environments", 642 pgs, IBM Jul. 2004.
Webster's New World Dictionary, Dictionary of Computer Terms, Sixth Edition, (4 pages).
Zerto Announces General Availability of Zerto Virtual Replication Version 4.0, May 5, 2015.
Zerto Inc.'s Motion for Judgment as a Matter of Law, May 6, 2015.
Zerto Raises 26 Million in Series D Financing to Accelerate Hybrid Cloud Adoption, Jun. 18, 2014.
Zerto Virtual Replication Release Notes, 2015.
Zerto, Inc's Brief in Support of Its Motion for a New Trial, and to Alter or Amend the Judgment, Due to an Inconsistent Verdict, Jun. 19, 2015.
Zerto, Inc's Brief in Support of Its Renewed Motion for Judgment As a Matter of Law or, in the Alternative, for a New Trial, Jun. 19, 2015.
Zerto's Hypervisor-based Replication: A New Approach to Business/Continuity Disaster Recovery, 2012.
Zerto's Hypervisor-Based, Enterprise-Class Replication and Continuous Data Protection, 2012.
Zerto's Protect Applications, Not Just Data: BC/DR for Virtualized Applications, 2012.
Zerto's ZVR and Hyper-V, 2014.
Office Action on U.S. Appl. No. 13/175,898 dated Dec. 18, 2015.
Appellant Zerto, Inc.'s Motion for Extension of Time to File its Initial Brief in the United States District Court for the District of Delaware in Case No. 1:12-cv-00956-GMS, May 4, 2016.
Appendix pages, dated May 8, 2017.
Appendix pages, dated May 9, 2017.
Corrected EMC Opening Brief, dated Sep. 16, 2016.
Corrected Non-Confidential Brief for Cross-Appellants EMC Corporation and EMC Israel Development Center Ltd, Appeals from the United States District Court for the District of Delaware in No. 1:12-cv-00956-GMS, Judge Gregory M. Sleet, dated Sep. 16, 2016.
Declaration of Allan Lipka before Patent Trial and Appeal Board, Patent Interference No. 106,070, dated Jun. 28, 2017.
Declaration of Christos Karamanolis, Ph.D., Patent Interference, 106,070, dated Jun. 27, 2017.
Declaration of Ian Jestice, Patent Interference No. 106,070, dated Jul. 6, 2017.
Declaration of James Dowell before Patent Trial and Appeal Board, Patent Interference No. 106,070, dated Jun. 29, 2017.
Declaration of Jeremy Tigan in support of EMC's Renewed Motion for an Ongoing Royalty Rate Covering Post-Judgment Sales in United States District Court for Delaware case 1:12-cv-00956-GMS dated Jul. 22, 2016. Parts I and II.
Declaration of John Blumenthal, dated Jul. 28, 2017.
Declaration of Matan Gilat before Patent Trial and Appeal Board, Patent Interference No. 106,070, dated Jun. 29, 2017.
Declaration of Matt Amdur before Patent Trial and Appeal Board, Patent Interference No. 106,070, dated Jun. 29, 2017.
Declaration of Oded Kedem in Support of Zerto's Opposition to EMC's Renewed Motion for an Ongoing Royalty Rate covering Post Judgement Sales in United States District Court for Delaware Case 1:12-cv-00956-GMS, dated Sep. 1, 2016.
Declaration of Thomas R. Galligan before Patent Trial and Appeal Board, Patent Interference No. 106,070, dated Jul. 6, 2017.
Declaration of Ziv Kedem in Support of Zerto's Opposition to EMC's Renewed Motion for an Ongoing Royalty Rate Covering Post Judgment Sales in the United States District Court for Delaware Case 1:12-cv-00956-GMS, dated Sep. 1, 2016.
Declaration-Bd.R. 203(b) USPTO Natanzon (U.S. Appl. No. 13/404,129) et al v Kedem (U.S. Appl. No. 13/039,446), dated Jan. 17, 2017.
Defendant Zerto, Inc.'s Notice of Appeal in the United States District Court for the District of Delaware, Case No. 12-956-GMS, dated Sep. 7, 2017.
Defendant Zerto, Inc.'s. Notice of Appeal in the United States District Court, dated Sep. 7, 2017.
Defendant Zerto's Answering Brief in Opposition to Plaintiffs Motion Concerning an Ongoing Royalty Rate Covering Post Judgment Sales in United States District Court for Delaware Case 1:12-cv-00956-GMS, dated Sep. 1, 2016.
Defendant Zerto's Notice of Appeal, Case 1:12-cv-00956-GMS, dated Sep. 7, 2017.
Defendant Zerto's Objections to Plaintiffs Bill of Costs, Case 1:12-cv-00956-GMS, dated Aug. 21, 2017.
Email from Allan Lipka dated Apr. 4, 2006, Re: Ezra Tech DD Presentation.
Email from Allan Lipka dated Feb. 28, 2006, Re:Topio.
Email from Chen Burshan dated Aug. 17, 2006, Re: Version 2.3 core documents.
Email from Christos Karamanlis dated Apr. 3, 2006, Ezra Feedback.
Email from Christos Karamanolis dated Mar. 9, 2006, Kashya scalability testing.
Email from Christos Karamanolis, dated Jan. 30, 2016. FW: Disaster Recovery.
Email from Karthik Rau dated Mar. 15, 2006, Re: Updated Docs.
EMC's Motions to Supplement the Record on its Motion for Permanent Injunction, dated Dec. 4, 2015.
EMC's Opening Brief in Support of its Renewed Motion for an Ongoing Royalty Rate Covering Post Judgment Sales in United States District Court for Delaware case 1:12-cv-00956-GMS, dated Jul. 22, 2016.
EMC's Reply Brief, dated Jan. 11, 2017.

(56) References Cited

OTHER PUBLICATIONS

EMC's Reply Brief in Support of its Renewed Motion for an Ongoing Royalty Rate Covering Post-Judgment Sales in the United States District Court for Delaware Case 1:12-cv-00956-GMS, Oct. 4, 2016.
EMC's Reply in Support of Its Motion to Supplement the Record on Its Motion for a Permanent Injunction, dated Jan. 4, 2016.
EMC's Response Letter regarding Ongoing Royalty Rates. Case 1:12-cv-00956-GMS, Aug. 9, 2017.
Ex. 2030, Possible Configurations of a Kashya-based ESX DR solution v.2.
Ex. 2031, Word attachment to Jun. 21, 2006 email from J Blumenthal, Possible Configurations of a Kashya based ESX DR Solution.
Ex.2025, email from Allan Lipka dated Apr. 6, 2008, Ezra Feedback.
Ex.2026, Email from Shlomo Ahal dated Jun. 4, 2006, summaries for Shlomo's trip.
Ex.2027, VMware summary word attachment to email from S. Ahal, Patent Interference No. 106,070.
Ex.2028- VMware summary—Boston meetings attached to Jun. 4, 2016 email from Sh.Ahal.
Ex.2029, Possible Configurations of a K-Based ESX DR Solution v.1, Apr. 14, 2006.
Ex.2032, Email from John Blumenthal dated Jun. 21, 2006, Integration Discussion Notes.
Ex.2033, Email from Ziv Kedem dated Aug. 15, 2006, VMware Kashya Summary.
Ex.2034, Word attachment to Aug. 15, 2006 email from Z Kedem.
Ex.2035 Email from Narasimha Raghunandana dated Aug. 15, 2006, Kashya binary that can be installed in a virtual machine.
Ex.2037, Email from Shlomo Ahal dated Sep. 13, 2006, Fw:proj plan.
Exhibit 2024, VMware—answers PDF attachment to email from A.Lipka.
Exhibit 2038, Word attachment to Sep. 13, 2006 email from Shlomo Ahal, Disaster Recovery Project Plan.
Exhibit 2039, Kashya in VM Performance Evaluation.
Exhibit 2046, Initial Complaint in United States District Court for Delaware.
Exhibit 2051. Federal Circuit Affirmance Judgement 1-12-cv-00956-GMS, Jun. 12, 2017.
Exhibit A "Trade in Trade Up", dated Dec. 21, 2015.
Exhibit A United States Patent and Trademark Office; *Hughes Networks Systems LLC* v *California Institute of Technology*, dated Jan. 5, 2016.
Exhibit A Case 1:12-cv-00956-GMS, dated Sep. 1, 2016.
Exhibit A Case 1:12-cv-00956-GMS, dated Jul. 22, 2016.
Exhibit B Case 1:12-cv-00956-GMS, dated Jul. 22, 2016.
Exhibit B Case 1:12-cv-00956-GMS, dated Sep. 1, 2016.
Exhibit M, Case 1:12-cv-00956-GMS, dated Oct. 4, 2016.
Exhibit N, Case 1:12-cv-00956-GMS, dated Oct. 4, 2016.
Exhibit. 2059, Annotated Zerto Claim 1, Patent Interference No. 106,070.
Exhibit. 2060, Annotated EMC Claim 17.
Exhibit.2036, Email from Shlomo Ahal dated Aug. 28, 2006, iKVM Workplan.
Exhibit.2040, Email from Matt Amdur dated Feb. 20, 2007, KVM iSCI stability.
Exhibit.2041, Santorini Functional Specifications Document.
Exhibit.2042, Email from Tzach Schechner dated Mar. 1, 2007, Kashya org chart.
Exhibit.2043, Email from Allan Lipka dated Apr. 4, 2006, Diligence Follow Up Questions.
Exhibit.2044, Email from Yair Heller dated Apr. 6, 2006, Diligence follow up questions.
Exhibit.2045, Email from Karthik Rau dated Mar. 16, 2006, Fw: Kashya scalability testing.
Exhibit.2047, First Amended Complaint in United States District Court for Delaware 1-12-cv-00956-GMS/.
Exhibit.2048, Zerto's Amended Answer to the First Amended Complaint, Affirmative Defenses, and Counterclaims 1-12-cv-00956-GMS.
Exhibit.2049, Jury Verdict Form 1-12-cv-00956-Gms in United States District Court for Delaware.
Exhibit.2052, LinkedIn profile of Shlomo Ahal.
Exhibit.2053, Zerto Hypervisor-Based Replication.
Exhibit.2056, Zerto's U.S. Appl. No. 13/039,446.
Exhibit.2061, LinkedIn profile of Tzach Schechner.
Exhibits A-E Dated Dec. 4, 2015.
Ezra PowerPoint attachment to Apr. 4, 2006 Email from Allan Lipka, Kashya Company Overview.
Initial Conference Call Transcript of Mar. 16, 2017 Before Hon Sally Gardner Lane, Patent Interference No. 106,070.
Kashya Architecture PowerPoint attachment to Apr. 4, 2006 email from A.Lipka.
Kashya KBX5000 Product Release 2.0 Administrators Guide.
Kashya KBX5000 Product Release 2.3 Administrators Guide, dated Jul. 11, 2006.
Kashya KBX5000 Version 2.3 Release Notes, dated May 15, 2006.
Kedem Annotated Copy of Claims, Patent Interference No. 106,070, dated Feb. 14, 2017.
Kedem Clean Claims, Patent Interference No. 106,070, dated Jan. 31, 2017.
Kedem Exhibit 1001, LinkedIn Page of Matan Gilat.
Kedem Exhibit 1002, U.S. Patents Listing "Karamonlis, C." as an Inventor.
Kedem Exhibit 1003, U.S. Patent Application No. 2009/0254582 A1.
Kedem Exhibit 1004, Declaration of Ziv Kedem.
Kedem Exhibit 1005, Declaration of Oded Kedem.
Kedem Exhibit 1006, Declaration of Matthew D. Green.
Kedem Exhibit 1007, Priority Statement for Provisional Patent Application.
Kedem Exhibit 1008, Executed Acknowledgement of no. Contribution.
Kedem Exhibit 1009, Declaration and Power of Attorney for U.S. Appl. No. 13/404,129.
Kedem Exhibit 1010, Executive Summary.
Kedem Exhibit 1011, Investor Deck.
Kedem Exhibit 1012, Investor Voice Over.
Kedem Exhibit 1013, Zerto Overview.
Kedem Exhibit 1014, Zerto—Addressing the needs of Virtual Mission Critical Applications and Cloud, web.archive.org.
Kedem Exhibit 1015, Dictionary of Computer and Internet Terms.
Kedem Exhibit 1016, Small Computer System Interface-2, American National Standard for Information Systems, dated Jan. 31, 1994.
Kedem Exhibit 1017, Standard Affidavit, www.archive.org.
Kedem Exhibit 1018, Frequently Asked Questions, www.archive.org.
Kedem Exhibit 1019, "Kedem Brothers Launch Zerto, Bringing Disaster Recovery to the Cloud", www.web.archive.org.
Kedem Exhibit 1020, "Enterprise-Class Disaster Recovery for VMware", www.web.archive.org.
Kedem Exhibit 1021, "Hypervisor-Based, Enterprise-Class Replication and Continuous Data Protection", www.web.archive.org.
Kedem Exhibit 1022, "Hypervisor-Based Replication", www.web.archive.org.
Kedem Exhibit 1023, "Zerto Wins Best of Show and Gold Awards at VMworld 2011", www.web.archive.org.
Kedem Exhibit 1024, DVD of EMC Innovator Assaf Natanzon.
Kedem Exhibit 1025, Taylor, Colleen, "Red-hot DotCloud is Structure 2011 Launchpad Winner," Gigaom, dated Jun. 23, 2011.
Kedem Exhibit 1026, Application Data Sheet and Information Disclosure Statement filed for U.S. Appl. No. 13/039,446.
Kedem Exhibit 1027, Dr. Matthew Green CV.
Kedem Exhibit 1028, Yager, Tom, "Virtualization and I/O," Ahead of the Curve, InfoWorld, 25, 15: ProQuest, p. 26, dated Apr. 10, 2006.
Kedem Exhibit 1029, e-mail from ziv Kedem.
Kedem Exhibit 1030, e-mail from Ziv Kedem.
Kedem Exhibit 1031, e-mail from Oded Kedem regarding WebEx.
Kedem Exhibit 1032, Device Driver, foldoc.org.

(56) References Cited

OTHER PUBLICATIONS

Kedem Exhibit 1033, Sherr, Micah et al., "Signaling vulnerabilities in wiretapping systems," University of Pennsylvania, dated Nov. 8, 2005.
Kedem Exhibit 1034 VMware ESX Server, *Natanzon v. Kedem*, Interference No. 106,070.
Kedem Exhibit List.
Kedem List of Proposed Motions, Patent Interference No, 106,070, dated Mar. 8, 2017.
Kedem Notice of Related Proceedings, Patent Interference No. 106,070, dated Jan. 31, 2017.
Kedem Objections to the Admissibility of Natanzon'S Evidence—for exhibits and materials submitted with Natanzon Motions 1 and 2.
Kedem Opposition 1, *Kedem V. Assaf Natanzon* before the Patent Trial and Appeal Board, dated Oct. 20, 2017.
Kedem Opposition 2, *Kedem V. Assaf Natanzon* before the Patent Trial and Appeal Board, dated Oct. 20, 2017.
Letter to Court from EMC regarding Aug. 16 letter to stay Case1 :12-cv-00956-GMS, dated Aug. 18, 2016.
Letter to Court from Zerto regarding staying brief regarding Royalty Rate Case1 :12-cv-00956-GMS, dated Aug. 16, 2015.
Letter to Judge from Emc regarding Court of Appeals Federal Circuit Order, Case 1:12-cv-00956-GMS, dated Jun. 19, 2017.
Letter to Judge Sleet from Adam Poff Regarding Defendants Response to Plaintiffs Letter of Jun. 19, 2017, Case 1:12-cv-00956-GMS, dated Aug. 21, 2017.
Memorandum regarding Royalties, Case 1:12-cv-00956-GMS, dated Aug. 10, 2017.
Memorandum United States District Court Delaware, dated Mar. 31, 2016.
Natanzon Annotated Copy of Claims, Patent Interference No. 106,070, dated Feb. 14, 2017.
Natanzon Clean Claims, Patent Interference No. 106,070, dated Feb. 1, 2017.
Natanzon Exhibit 2008, Zerto Application No. 13/039,446 published as US 2011/0231841.
Natanzon Exhibit 2050, Zerto Judgment.
Natanzon Exhibit 2054, U.S. Appl. No. 61/314,589 Filing Receipt.
Natanzon Exhibit 2055, Pair Assignment tab of Zerto U.S. Appl. No. 61/314,589.
Natanzon Exhibit 2058, EMC U.S. Appl. No. 13/404,129 as Published US 20130014104 A1.
Natanzon Exhibit 2062, Petition Under 37 C.F.R and 1.47 A for U.S. Appl. No. 13/404,129.
Natanzon Exhibit 2063, Employment Agreement of Oded Kedem.
Natanzon Exhibit 2064, Inventions Assignment, Nondisclosure and Noncompetition Agreement of Shlomo Ahal.
Natanzon Exhibit 2065, International Key Employee Agreement of Tzach Shechner.
Natanzon Exhibit 2066, Ian Jestice CV.
Natanzon Exhibit 2067, Statement of Facts Submitted with Petition for Application on Behalf of Nonsigning Inventors.
Natanzon Exhibit 2068, Exhibit A Declaration and Assignment signed by Assaf Natanzon and Christos Karamanolis.
Natanzon Exhibit 2069, Renewed Petition, Sep. 5, 2012.
Natanzon Exhibit 2070, Decision on Renewed Petition mailed Sep. 21, 2012.
Natanzon Exhibit 2071, Response to Non-Final Office Action for U.S. Appl. No. 13/404,129.
Natanzon Exhibit 2072, Supplemental Application Data Sheet filed Jul. 11, 2017.
Natanzon Exhibit List.
Natanzon List of Proposed Motions, Patent Interference No. 106,070, Mar. 8, 2017.
Natanzon Motion 1.
Natanzon Motion 2 (to correct inventorship).
Natanzon Notice of Notice of Filing Deposition Transcripts.
Natanzon Notice of Related Proceedings, Patent Interference No. 106,070, dated Feb., 1, 2017.
Natanzon Priority Statement, dated Jul. 7, 2017.
Natanzon Request for File Copies, Patent Interference No. 106,070, dated Feb. 1, 2017.
Natanzon Updated Exhibit List.
Natanzon, Exhibit 2073, Authorization to Charge Fees for Correction of Inventorship.
Non Confidential Joint Appendix Pt.1, U.S. Court of Appeals for Federal Circuit. Case 16/1856, Document 56-2, filed Jan. 18, 2017.
Non Confidential Joint Appendix Pt.2 U.S. Court of Appeals for Federal Circuit, Case 16/1856, Document 56-3, filed Jan. 18, 2017.
Non Confidential Joint Appendix vol. 1 Part 1, dated Jan. 18, 2017.
Non Confidential Joint Appendix vol. 1 Part 2. dated Jan. 18, 2017.
Non Confidential Joint Appendix vol. 2 Part 1, dated Jan. 18, 2017.
Non Confidential Joint Appendix vol. 2 Part 2, dated Jan. 18, 2017.
Non Confidential Joint Appendix vol. 3, dated Jan. 18, 2017.
Non-Confidential Joint Appendix in the United States Court of Appeals for the Federal Circuit, vol. I of III, pp. Appx1-1597, Case No. 2016-1856, -1883, dated Jan. 18, 2017.
Non-Confidential Joint Appendix in the United States Court of Appeals for the Federal Circuit, vol. II of III, pp. Appx1-1616-4883, Case No. 2016-1856, -1883, dated Jan. 18, 2017.
Non-Confidential Joint Appendix Pt.1 Case 16/1856, Document 56-1 Filed dated Jan. 18, 2017.
Non-Confidential Joint Appendix U.S. Pat. No. 6,073,209 in the United States Court of Appeals for the Federal Circuit, Case No. 2016-1856, -1883, dated Jan. 18, 2017, Parts I and II.
Non-Confidential Joint Appendix U.S. Pat. No. 7,603,395 B1 in the United States Court of Appeals for the Federal Circuit, Case No. 2016-1856, -1883, dated Jan. 18, 2017.
Non-Confidential Joint Appendix vol. I of III, pp. Appx1-1597 in the United States Court of Appeals for the Federal Circuit, Case No. 2016-1856, -1883, dated Jan. 18, 2017.
Non-Confidential Joint Appendix vol. II of III, pp. Appx1616-4883 in the United States Court of Appeals for the Federal Circuit, Case No. 2016-1856, -1883, dated Jan. 18, 2017.
Non-Confidential Joint Appendix vol. III of III, pp. Appx4884-5884 in the United States Court of Appeals for the Federal Circuit, Case No. 2016-1856, -1883, dated Jan. 18, 2017.
Notice of Allowance on U.S. Appl. No. 13/175,898, dated Mar. 29, 2017 (9 pages).
Office Action on U.S. Appl. No. 13/175,898, dated Nov. 4, 2016 (11 pages).
Office Action on U.S. Appl. No. 15/240,847, dated May 15, 2017 (12 pages).
Opposition of Cross-Appellants EMC Corporation and EMC Israel Development Center Ltd. To Appellant Zerto, Inc.'S Motion for Extension of Time to File Its Response/Reply Brief, Appeals from the United States District Court for the District of Delaware in No. 1:12-cv-00956-GMS, Judge Gregory M. Sleet, dated Sep. 30, 2016.
Order Authorizing Copies of Office Records, Patent Interference No. 106,070, filed Feb. 2, 2016.
Order Granting Extension of Time to file Opening Brief, dated May 11, 2016.
Order Miscellaneous Bd. R. 104a, *Natanzon V. Kedem*, dated Jul. 11, 2017.
Order Motion Times Mar. 16 Call, Patent Interference No. 106,070, Entered Mar. 20, 2017.
Order on Motion, United States Court of Appeals for the Federal Circuit, Case No. 2016-1856,-1883, dated Oct. 5, 2016.
Order regarding Post-Trial Motion, dated Mar. 31, 2016.
Plaintiff EMC and EMC Israel Development Center Ltd., Bill of Costs in the United States District Court for Delaware, Case 1:12-cv-00956-GMS, dated Aug. 8, 2017.
PowerPoint attachment to Jan 30, 2006 email from Christos Karamanlis.
Project: Ezra Technical Due Diligence Meeting Notes, dated Mar. 28-31, 2006.
Standing Order Before the Board of Patent Appeals and Interferences entered Mar. 8, 2011.
Supplement to Natanzon Motion 2, dated Jul. 11, 2017.
U.S. Notice of Allowance on U.S. Appl. No. 13/175,892 dated Oct. 17, 2017 (5 pages).
U.S. Notice of Allowance on U.S. Appl. No. 13/175,892 dated Oct. 3, 2017 (8 pages).

(56) References Cited

OTHER PUBLICATIONS

U.S. Office Action on U.S. Appl. No. 15/231,388 dated Aug. 29, 2017 (10 pages).
U.S. Office Action on U.S. Appl. No. 15/240,847 dated Oct. 23, 2017 (23 pages).
Word attachment to Mar. 15, 2006 email from K. Rau, Esx Disaster Recovery Roadmap.
Zerto Continuation application as published US20160357593 A1.
Zerto, Inc.'s Appeal Brief in the United States District Court for the District of Delaware in No. 1:12-cv-00956-GMS, Judge Gregory M. Sleet, dated Aug. 5, 2016.
Zerto's Appeal Brief, dated Aug. 5, 2016.
Zerto's Corrected Response and Reply Brief, dated Dec. 21, 2016.
Zerto's Motion for Extension of Time to file its Initial Brief, dated May 4, 2016.
Zerto's Opposition to the EMC Motion to Supplement the Record, dated Dec. 21, 2015.
Notice of Allowance on U.S. Appl. No. 13/175,892 dated Mar. 2, 2018.
Office Action on U.S. Appl. No. 15/194,097 dated Feb. 20, 2018.
Office Action on U.S. Appl. No. 15/231,388 dated Feb. 23, 2018.
Office Action on U.S. Appl. No. 15/289,568 dated Mar. 29, 2018.
U.S. Notice of Allowance, dated Jun. 14, 2018, issued in U.S. Appl. No. 13/175,892.
U.S. Notice of Allowance, dated Jul. 5, 2018, issued in U.S. Appl. No. 15/289,568.
U.S. Notice of Allowance, dated Jul. 27, 2018, issued in U.S. Appl. No. 15/194,097.
U.S. Notice of Allowance, dated Aug. 16, 2018, issued in U.S. Appl. No. 15/231,388.
Amended Order Governing Mediation Conferences and Meditation Statements for the United States District Court for the District of Delaware Case 1:12-cv-00956-GMS dated Jun. 1, 2016.
Decision—Motion - Bd. R. 5(a): 121(a) (3), Patent Interference No. 106,070, Sep. 18, 2017.
Declaration of Lucas Silva in Support of Zerto's Opposition to EMC's Renewed Motion for an Ongoing Royalty Rate Covering Post Judgment Sales in the United States District Court for Delaware Case 1:12-cv-00956-GMS, Sep. 1, 2016.
Declaration of Nathan Speed in Support of EMC's Reply Brief in Support of its Motion for a Renewed Ongoing Royalty in the United States District Court for Delaware Case 1:12-vc-00956-GMS dated Oct. 4, 2016.
Declaration of Nathan Speed in Support of Plaintiffs Bill of Costs, Case 1:12-cv-00956-GMS, Aug. 8, 2017.
E-mail from Christos Karamanolis, dated Apr. 3, 2006, Re: Ezra feedback.
Email from U.S. Court of Appeals for the Federal Circuit re Nov. 30, 2017 Clerk's Notice of Deficient Document.
Email from USPTO re Mar. 31, 2017 Filing Submission for 106070.
EMC Corporation and EMC Israel Development Center Ltd.'s Docketing Statement in the United States Court of Appeals for the Federal Circuit, Case No. 16/1856, 16/1883, Apr. 29, 2016.
EMC Corporation's Corrected Docketing Statement in the United States Court of Appeals for the Federal Circuit, Case No. 17/2519, Sep. 22, 2017.
EMC's corrected docketing statement dated Sep. 22, 2017.
EMC's Docketing Statement dated Apr. 29, 2016.
EMC's Motions for Redaction of Electronic Transcripts and Notice of Lodging Redacted Transcripts and Proposed Order dated Apr. 19, 2016.
EMC's Notice of Intent to Redact dated Apr. 5, 2016.
EMC's Renewed Motion for an Ongoing Royalty Rate Covering Post-Judgement Sales in the United States District Court for the District of Delaware Case 1:12-cv-00956-GMS dated Jul. 14, 2016.
Exhibit O, Case 1:12-cv-00956-GMS, Oct. 4, 2016.
Exhibit P, Case 1:12-cv-00956-GMS, Oct. 4, 2016.
Interference Efiling Receipt, No. 106070, Jan. 31, 2017.
Judgment—Bd. R. 127 (a), issued in Patent Interference No. 106,070, Dec. 20, 2018.
Judgment from the United States Court of Appeals for the Federal Circuit dated Jun. 12, 2017.
Kedem Notice of Change of Lead and Backup Counsel, Patent Interference No. 106,070 (Sep. 12, 2017).
Kedem Notice of Deposition for Alan Lipka for Sep. 29, 2017, Patent Interference No. 106,070 (Sep. 11, 2017).
Kedem Notice of Deposition for Chris Karamanolis for Sep. 25 and 26, 2017, Patent Interference No. 106,070 (Sep. 11, 2017).
Kedem Notice of Deposition for Ian Jestice for Sep. 28, 2017, Patent Interference No. 106,070 (Sep. 11, 2017).
Kedem Notice of Deposition for Matt Amdur for Sep. 26, 2017, Patent Interference No. 106,070 (Sep. 11, 2017).
Kedem Notice of Deposition of Matan Gilat for Sep. 14, 2017, Patent Interference No. 106,070 (Sep. 11, 2017).
Kedem Notice of Lead and Backup Counsel, Patent Interference No. 106,070, Jan. 31, 2017.
Kedem Notice of Real Party in Interest, Patent Interference No. 106,070, Jan. 31, 2017.
Kedem Notice of Settlement Discussions, Patent Interference No. 106,070, May 4, 2017.
Kedem Priority Statement, Patent Interference No. 106,070, Filed Jul. 7, 2017.
Kedem Request for File Copies, Patent Interference No. 106,070, Jan. 31, 2017.
Letter from EMC to court enclosing appendix pages dated May 8, 2017.
Letter from Zerto to Court enclosing appendix pages date May 9, 2017.
Mandate from Court of Appeals for Federal Circuit, Case 1:12-cv-00956-GMS,Jul. 19, 2017.
Mandate from United State Court of Appeals for the Federal Circuit dated Jul. 19, 2017.
Natanzon Exhibit 2005, Declaration of Matt Amdur, Patent Interference No. 106,070, Jun. 29, 2017.
Natanzon Exhibit 2006, Declaration of Matan Gilat, Patent Interference No. 106,070, Jun. 29, 2017.
Natanzon Exhibit 2075, Declaration of Nathan R. Speed in Support of Motion for Admission Pro Hac Vice, Patent Interference No. 106,070, Sep. 11, 2017.
Natanzon Exhibit 2076, Transcript of Deposition of Matan Gilat, Sep. 14, 2017.
Natanzon Exhibit 2077, Transcript of Deposition of Allan Lipka, Sep. 28, 2017.
Natanzon Exhibit 2078, Transcript of Deposition of Allan Lipka, Sep. 29, 2017.
Natanzon Exhibit 2079, Transcript of Deposition of Christos Karamanolis, Sep. 25, 2017.
Natanzon Exhibit 2080, Transcript of Deposition of Christos Karamanolis, Sep. 26, 2017.
Natanzon Exhibit 2081, Transcript of Deposition of Matthew Amdur, Sep. 26, 2017.
Natanzon Notice of Change in Lead and Backup Counsel, Patent Interference No. 106,070, Jun. 6, 2017.
Natanzon Notice of Lead and Backup COunsel, Patent Interference No. 106,070, Feb. 1, 2017.
Natanzon Notice of Real Party in Interest, Patent Interference No, 106,070, Feb. 1, 2017.
Natanzon Notice of Service of Supplemental Evidence, Patent Interference No. 106,070, dated Jul. 28, 2017.
Natanzon Notice of Serving Priority Statement, Patent Interference No. 106,070, Jul. 10, 2017.
Natanzon Unopposed Miscellaneous Motion 1 (Request for pro hac vice admission of Nathan R. Speed), Patent Interference No. 106,070 (Sep. 12, 2017).
Natanzon Updated Exhibit List, Patent Interference No. 106,070, Jul. 28, 2017.
Natanzon Updated Exhibit List, Patent Interference No. 106,070, Sep. 12, 2017.
Notice of Allowance on U.S. Appl. No. 13/175,892 dated Oct. 31, 2018.
Notice of Allowance on U.S. Appl. No. 14/687,341 dated Sep. 19, 2016.

(56) References Cited

OTHER PUBLICATIONS

Notice of Allowance on U.S. Appl. No. 15/194,097 dated Jan. 28, 2019.
Notice of Allowance on U.S. Appl. No. 15/194,097 dated Oct. 16, 2018.
Notice of Allowance on U.S. Appl. No. 15/231,388 dated Jan. 18, 2019.
Notice of Allowance on U.S. Appl. No. 15/231,388 dated Jan. 30, 2019.
Notice of Allowance on U.S. Appl. No. 15/231,388 dated Oct. 12, 2018.
Notice of Allowance on U.S. Appl. No. 15/240,847 dated Nov. 15, 2018.
Notice of Allowance on U.S. Appl. No. 15/289,568 dated Feb. 12, 2019.
Notice of Allowance on U.S. Appl. No. 15/289,568 dated Oct. 23, 2018.
Notice of Appeal by Zerto dated Apr. 14, 2016.
Notice of Docket, United States Court of Appeals for the Federal Circuit, Case 1:12-cv-00956-GMs, Sep. 8, 2017.
Notice of Docketing dated Apr. 15, 2016.
Notice of Docketing dated Apr. 19, 2016.
Notice of Docketing for the United State Court of Appeals for the Federal Circuit, 17/2519—*EMC Corporation V. Zerto Inc*, Sep. 8, 2017.
Notice of Docketing from the United States District Court for the District of Delaware, *EMC Corporation V. Zerto Inc.*, Case No. 1:12-cv-00956-GMS.
Notice of Docketing on Septmember 8, 2017 in the United States Court of Appeals for the Federal Circuit.
Notice of Entry of Judgment Without Opinion Entered Jun. 12, 2016, Case 1:12-cv-00956-GMS, Jun. 13, 2016.
Notice of Entry of Judgment without Opinion in the United States Court of Appeals for the Federal Court, Case No. 16/1856, Jun. 12, 2017.
Notice of Judgment without Opinion dated Jun. 12, 2017.
Notice of Subsequent Authority dated Jan. 5, 2016.
Notice of Withdrawal of Certain Pro Hac Vice Counsel Aaron Moore dated Apr. 11, 2016.
Notice of Withdrawal of Monte Squire dated Nov. 11, 2015.
Order Appellant Zerto's Response and Reply Brief dated Dec. 7, 2016.
Order Governing Mediation Conferences and Mediation Statements dated Apr. 19, 2016.
Order Regarding Royalties in the District Court for Delaware, Case 1:12-cv-009560-GMS, Aug. 10, 2017.
Order rejecting EMC Corporation's Opening Brief in the United States Court of Appeals for the Federal Circuit, Case No. 16/1856, Sep. 15, 2016.
Order Rejecting EMC's Opening Brief dated Sep. 15, 2016.
Order-Miscellaneous—Bs.R 104(a), Patent Interference No. 106,070, Filed Jun. 15, 2017.
Plaintiffs Notice of Cross Appeal dated Apr. 18, 2016.
Zerto Inc Docketing Statement dated Apr. 29, 2016.
Zerto, Inc.'s Docketing Statement in the United States Court of Appeals for the Federal Circuit, Case No. 16/1856, 16/1883, Apr. 29, 2016.
Zerto. Inc.'s Certificate of Interest in the United States Court of Appeals for the Federal Circuit, Case No. 16/1856, 16/1883, Apr. 29, 2016.
Zerto's Docketing Statement dated Sep. 22, 2017.
Zerto's Docketing Statement in the United States Court of Appeals for the Federal Circuit, Case No. 172519, Sep. 22, 2017.
Zerto's Notice of Intent to Redact dated Apr. 5, 2016.
Zertos's Citation of Supplemental Authority and Matthew Lowrie's certificate of service dated May 3, 2017.
Affidavit of Christopher Butler and Exhibit A regarding Ex. 1, dated Nov. 8, 2017.
Affidavit of Christopher Butler and Exhibit A regarding Exs., dated Nov. 8, 2017.
Clerk's Notice of Deficient Document, dated Nov. 30, 2017.
Declaration of Lisa Kieper, dated Nov. 13, 2017.
Kedem Exhibit 1035, Transcript of Video Deposition of Ziv Kedem, dated Dec. 7, 2017.
Kedem Exhibit 1036, Transcript of Video Deposition of Matthew Green, dated Dec. 13, 2017.
Kedem Exhibit 1037, Transcript of Video Deposition of Oded Kedem, dated Dec. 19, 2017.
Kedem Exhibit 1038, Kedem Objections to the Admissibility of Natanzon's Evidence (for exhibits and materials submitted with Natanzon Motions 1 and 2), dated Jul. 14, 2017.
Kedem Exhibit 1039, Kedem Objections to the Admissibility of Natanzon's Evidence (for exhibits and materials submitted with Natanzon Replies 1 and 2), dated Jan. 12, 2018.
Kedem Miscellaneous Motion 1 (to exclude Natanzon's Evidence, dated Jan. 17, 2018.
Kedem Notice of Filing and Service of Deposition Transcripts, Patent Interference No. 106,070, dated Jan. 5, 2018.
Kedem Notice of Service of Supplemental Evidence, dated Nov. 13, 2017.
Kedem Objections to the Admissibility of Natanzon's Evidence (for exhibits and materials submitted with Natanzon Replies 1 and 2), dated Jan. 12, 2018.
Kedem Opposition to Natanzon Motion to Exclude Evidence, dated Feb. 1, 2018.
Kedem Reply 1 (to Exclude Natanzon Evidence), dated Feb. 7, 2018.
Kedem Request for Oral Argument, dated Jan. 17, 2018.
Kedem Updated Exhibit List, dated Jan. 17, 2018.
Kedem Updated Exhibit List, Patent Interference No. 106,070, dated Jan. 5, 2018.
Natanzon Exhibit 2082, Kedem Opposition 1 to Natanzon Motion for Judgment under 35 U.S.C. sec. 102(f), dated Oct. 20, 2017.
Natanzon Exhibit 2085, Zerto, Manchester VMUG 2014 and Technical Overview.
Natanzon Exhibit 2086, LinkedIn Profile of Darren Swift, Rubrik, Inc., dated Dec. 5, 2017.
Natanzon Exhibit 2087, Cisco MDS 9000 Family SANTap with EMC RecoverPoint Design Guide, dated Apr. 2009.
Natanzon Exhibit 2088, Disk Backup, A look inside continuous data protection software, dated Dec. 6, 2017.
Natanzon Exhibit 2091, Webster's Ninth New Collegiate Dictionary, Miriam-Webster, p. 630 (1990).
Natanzon Exhibit 2094, Denning, Dorothy E., Cryptography and Data Security, Addison-Wesley Publishing Company, Inc., 1982.
Natanzon Exhibit 2095, U.S. Patent Application No. 2007/0220311 A1, published Sep. 20, 2007.
Natanzon Exhibit 2096, Webster's Ninth New Collegiate Dictionary, Miriam-Webster, p. 1206 (1990).
Natanzon Exhibit 2097, Assignment for U.S. Patent Application No. 2011/356,920, Reel 017879 Frame 0115-0117, dated May 12, 2006.
Natanzon Exhibit 2098, U.S. Office Action for U.S. Appl. No. 13/039,446 dated Jan. 2, 2015.
Natanzon Exhibit 2099, Natanzon Objections to the Admissibility of Kedem's Evidence (for exhibits and materials submitted with Kedem Oppositions 1 and 2), dated Oct. 27, 2017.
Natanzon Motion to Exclude, dated Jan. 17, 2018.
Natanzon Notice of Deposition of Oded Kedem, dated Dec. 1, 2017.
Natanzon Notice of Deposition of Professor Matthew Green, dated Dec. 1, 2017.
Natanzon Notice of Deposition of Ziv Kedem, dated Dec. 1, 2017.
Natanzon Notice of Filing Deposition Transcripts, Patent Interference No. 106,070, dated Oct. 19, 2017.
Natanzon Objections to the Admissibility of Kedem's Evidence, for exhibits and materials submitted with Kedem Oppositions 1 and 2, dated Oct. 27, 2017.
Natanzon Opposition to Kedem Miscellaneous Motion 1 (to exclude Natanzon's Evidence), dated Feb. 1, 2018.
Natanzon Reply 1, dated Jan. 9, 2018.
Natanzon Reply 2, dated Jan. 9, 2018.
Natanzon Request for Oral Argument, dated Jan. 17, 2018.
Natanzon Updated Exhibit List, Patent Interference No. 106,070, dated Oct. 19, 2017.

(56) References Cited

OTHER PUBLICATIONS

Notice of Stipulation to Extend Time Periods 4-6, dated Nov. 30, 2017.
Reply in Support of Natanzon Motion to Exclude, dated Feb. 7, 2018.
Natanzon Decision on Rehearing—Bd. R. 125(c), Patent Interference No. 106,070, Apr. 30, 2019.
Natanzon Kedem Opposition 5 (to Natanzon Motion 5, Request for Rehearing) Patent Interference No. 106,070, Mar. 8, 2019.
Natanzon Miscellaneous Motion 5 (Request for Hearing of Decision and Judgement) Patent Interference No. 106,070, Jan. 22, 2019.
Natanzon Order—Authorizing Opposition and Reply—Bd. R. 125(c)(4), Patent Interference No. 106,070, Feb. 6, 2019.
Natanzon Reply 5 (to Opposition to Request for Hearing of Decision and Judgement), Patent Interference No. 106,070, Mar. 22, 2019.
Notice of Allowance on U.S. Appl. No. 15/194,097 dated May 15, 2019.
Notice of Allowance on U.S. Appl. No. 15/231,388 dated May 20, 2019.
Notice of Allowance on U.S. Appl. No. 15/240,847 dated Jun. 12, 2019.
Notice of Allowance on U.S. Appl. No. 15/289,568 dated Jun. 3, 2019.
Notice of Allowance on U.S. Appl. No. 13/039,446 dated Jan. 13, 2020.
Notice of Allowance on U.S. Appl. No. 15/194,097 dated Dec. 30, 2019.
Notice of Allowance on U.S. Appl. No. 15/231,388 dated Jan. 23, 2020.
Notice of Allowance on U.S. Appl. No. 13/039,446 dated Nov. 21, 2019.
Notice of Allowance on U.S. Appl. No. 15/194,097 dated Sep. 11, 2019, 5 pages.
Notice of Allowance on U.S. Appl. No. 15/231,388 dated Sep. 16, 2019, 8 pages.

* cited by examiner

METHODS AND APPARATUS FOR PROVIDING HYPERVISOR LEVEL DATA SERVICES FOR SERVER VIRTUALIZATION

CROSS REFERENCES TO RELATED APPLICATIONS

This application is a continuation of U.S. application Ser. No. 13/175,898, titled METHODS AND APPARATUS FOR PROVIDING HYPERVISOR LEVEL DATA SERVICES FOR SERVER VISUALIZATION, filed Jul. 4, 2011 by inventor Ziv Kedem, and a continuation-in-part of U.S. application Ser. No. 13/039,446, titled METHODS AND APPARATUS FOR PROVIDING HYPERVISOR LEVEL DATA SERVICES FOR SERVER VIRTUALIZATION, filed on Mar. 3, 2011 by inventor Ziv Kedem, which claims priority benefit of U.S. Provisional Application No. 61/314,589, titled METHODS AND APPARATUS FOR PROVIDING HYPERVISOR LEVEL DATA SERVICES FOR SERVER VIRTUALIZATION, filed on Mar. 17, 2010 by inventor Ziv Kedem.

FIELD OF THE INVENTION

The present invention relates to virtual server computing environments.

BACKGROUND OF THE INVENTION

Data center virtualization technologies are now well adopted into information technology infrastructures. As more and more applications are deployed in a virtualized infrastructure, there is a growing need for recovery mechanisms to support mission critical application deployment, while providing complete business continuity and disaster recovery.

Virtual servers are logical entities that run as software in a server virtualization infrastructure, referred to as a "hypervisor". Examples of hypervisors are VMWARE® ESX manufactured by VMware, Inc. of Palo Alto, Calif., HyperV manufactured by Microsoft Corporation of Redmond, Wash., XENSERVER® manufactured by Citrix Systems, Inc. of Fort Lauderdale, Fla., Redhat KVM manufactured by Red hat, Inc. of Raleigh, N.C., and Oracle VM manufactured by Oracle Corporation of Redwood Shores, Calif. A hypervisor provides storage device emulation, referred to as "virtual disks", to virtual servers. Hypervisor implements virtual disks using back-end technologies such as files on a dedicated file system, or raw mapping to physical devices.

As distinct from physical servers that run on hardware, virtual servers run their operating systems within an emulation layer that is provided by a hypervisor. Although virtual servers are software, nevertheless they perform the same tasks as physical servers, including running server applications such as database applications, customer relation management applications and MICROSOFT EXCHANGE SERVER®. Most applications that run on physical servers are portable to run on virtual servers. As distinct from virtual desktops that run client side applications and service individual users, virtual servers run applications that service a large number of clients.

As such, virtual servers depend critically on data services for their availability, security, mobility and compliance requirements. Data services include inter alia continuous data protection, disaster recovery, remote replication, data security, mobility, and data retention and archiving policies.

Conventional replication and disaster recovery systems were not designed to deal with the demands created by the virtualization paradigm. Most conventional replication systems are not implemented at the hypervisor level, with the virtual servers and virtual disks, but instead are implemented at the physical disk level. As such, these conventional systems are not fully virtualization-aware. In turn, the lack of virtualization awareness creates an operational and administrative burden, and a certain degree of inflexibility.

It would thus be of advantage to have data services that are fully virtualization-aware.

SUMMARY OF THE DESCRIPTION

Aspects of the present invention relate to a dedicated virtual data service appliance (VDSA) within a hypervisor that can provide a variety of data services. Data services provided by the VDSA include inter alia replication, monitoring and quality of service. The VDSA is fully application-aware.

In an embodiment of the present invention, a tapping filter driver is installed within the hypervisor kernel. The tapping driver has visibility to I/O requests made by virtual servers running on the hypervisor.

A VDSA runs on each physical hypervisor. The VDSA is a dedicated virtual server that provides data services; however, the VDSA does not necessarily reside in the actual I/O data path. When a data service processes I/O asynchronously, the VDSA receives the data outside the data path.

Whenever a virtual server performs I/O to a virtual disk, the tapping driver identifies the I/O requests to the virtual disk. The tapping driver copies the I/O requests, forwards one copy to the hypervisor's backend, and forwards another copy to the VDSA.

Upon receiving an I/O request, the VDSA performs a set of actions to enable various data services. A first action is data analysis, to analyze the data content of the I/O request and to infer information regarding the virtual server's data state. E.g., the VDSA may infer the operating system level and the status of the virtual server. This information is subsequently used for reporting and policy purposes.

A second action, optionally performed by the VDSA, is to store each I/O write request in a dedicated virtual disk for journaling. Since all I/O write requests are journaled on this virtual disk, the virtual disk enables recovery data services for the virtual server, such as restoring the virtual server to an historical image.

A third action, optionally performed by the VDSA, is to send I/O write requests to different VDSAs, residing on hypervisors located at different locations, thus enabling disaster recovery data services.

The hypervisor architecture of the present invention scales to multiple host sites, each of which hosts multiple hypervisors. The scaling flexibly allows for different numbers of hypervisors at different sites, and different numbers of virtual services and virtual disks within different hypervisors. Each hypervisor includes a VDSA, and each site includes a data services manager to coordinate the VSDA's at the site, and across other sites.

Embodiments of the present invention enable flexibly designating one or more virtual servers within one or more hypervisors at a site as being a virtual protection group, and flexibly designating one or more hypervisors, or alternatively one or more virtual servers within one or more hypervisors at another site as being a replication target for the virtual protection group. Write order fidelity is maintained for virtual protection groups. A site may comprise any number of source and target virtual protection groups. A virtual protection group may have more than one replication target. The number of hypervisors and virtual servers within a virtual protection group and its replication target are not required to be the same.

The hypervisor architecture of the present invention may be used to provide cloud-based hypervisor level data services to multiple enterprises on a shared physical infrastructure, while maintaining control and data path separation between enterprises for security.

The present invention provides bi-directional cloud-based data replication services; i.e., from the enterprise to the cloud, and from the cloud to the enterprise. Moreover, replication targets may be assigned to a pool of resources that do not expose the enterprise infrastructure, thus providing an additional layer of security and privacy between enterprises that share a target physical infrastructure.

The cloud-based data replication services of the present invention support enforcement of data export regulations. As such, data transfer between a source and a destination is automatically restricted if data export regulations restrict data transfer between the corresponding jurisdictions of the source and the destination.

There is thus provided in accordance with an embodiment of the present invention a system for cloud-based data services for multiple enterprises, including a plurality of cloud hypervisors that cooperatively provide cloud-based services to multiple enterprises, each hypervisor including a plurality of cloud virtual servers, each cloud virtual server being associated with an enterprise, at least one cloud virtual disk that is read from and written to by the at least one virtual server, each cloud virtual disk being associated with an enterprise, and a virtual data services appliance, which provides cloud-based data services, and multiple data services managers, one data services manager per respective enterprise, each of which coordinates the respective virtual data services appliances for those cloud hypervisors that service its corresponding enterprise.

There is additionally provided in accordance with an embodiment of the present invention a system for cloud-based data services for multiple enterprises, including a plurality of cloud hypervisors that cooperatively provide cloud-based services to multiple enterprises, each hypervisor including a plurality of cloud virtual servers, each cloud virtual server being associated with an enterprise, at least one cloud virtual disk that is read from and written to by the at least one virtual server, each cloud virtual disk being associated with an enterprise, and at least one virtual data services appliance, one virtual data services appliance per respective enterprise serviced by the hypervisor, which provides cloud-based data services to its respective enterprise, and multiple data services managers, one data services manager per respective enterprise, each of which coordinates the virtual data services appliances that service its respective enterprise.

There is further provided in accordance with an embodiment of the present invention a system for cloud-based data services for multiple enterprises, including a plurality of cloud hypervisors that cooperatively provide cloud-based services to multiple enterprises, each enterprise being located in a corresponding jurisdiction, and each hypervisor being associated with a corresponding jurisdiction, wherein each hypervisor includes a plurality of cloud virtual servers, each cloud virtual server being associated with an enterprise, and at least one cloud virtual disk that is read from and written to by the at least one virtual server, each cloud virtual disk being associated with an enterprise, and a rights manager that restricts access of an enterprise to a cloud hypervisor associated with the enterprise if there is a restriction to export data between the jurisdiction associated with the enterprise and the jurisdiction associated with the cloud hypervisor.

BRIEF DESCRIPTION OF THE DRAWINGS

The present invention will be more fully understood and appreciated from the following detailed description, taken in conjunction with the drawings in which.

LIST OF APPENDICES

Appendix I is an application programming interface for virtual replication site controller web services, in accordance with an embodiment of the present invention;

Appendix II is an application programming interface for virtual replication host controller web services, in accordance with an embodiment of the present invention;

Appendix III is an application programming interface for virtual replication protection group controller web services, in accordance with an embodiment of the present invention;

Appendix IV is an application programming interface for virtual replication command tracker web services, in accordance with an embodiment of the present invention; and Appendix V is an application programming interface for virtual replication log collector web services, in accordance with an embodiment of the present invention.

DETAILED DESCRIPTION

Aspects of the present invention relate to a dedicated virtual data services appliance (VDSA) within a hypervisor, which is used to provide a variety of hypervisor data services. Data services provided by a VDSA include inter alia replication, monitoring and quality of service.

Figure 1:
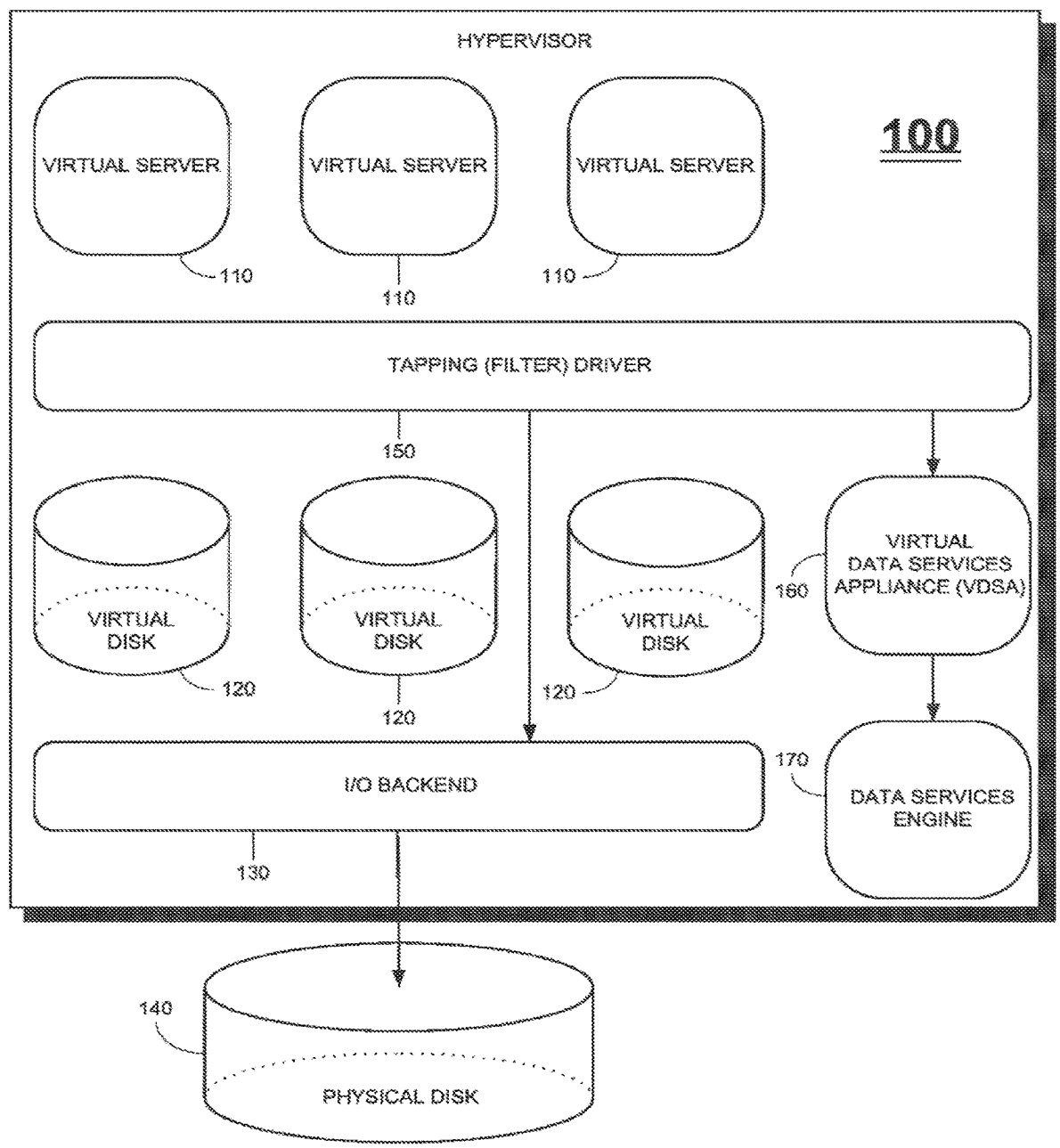
FIG. 1 is a simplified block diagram of a hypervisor architecture that includes a tapping driver and a virtual data services appliance, in accordance with an embodiment of the present invention.

Reference is made to FIG. 1, which is a simplified block diagram of a hypervisor architecture that includes a tapping driver and a VDSA, in accordance with an embodiment of the present invention. Shown in FIG. 1 is a hypervisor 100 with three virtual servers 110, three virtual disks 120, an I/O backend 130 and a physical storage array 140. Hypervisor 100 uses a single physical server, but runs multiple virtual servers 110. Virtual disks 120 are a storage emulation layer that provide storage for virtual servers 110. Virtual disks 120 are implemented by hypervisor 100 via I/O backend 130, which connects to physical disk 140.

Hypervisor 100 also includes a tapping driver 150 installed within the hypervisor kernel. As shown in FIG. 1, tapping driver 150 resides in a software layer between virtual servers 110 and virtual disks 120. As such, tapping driver 150 is able to access I/O requests performed by virtual servers 110 on virtual disks 120. Tapping driver 150 has visibility to I/O requests made by virtual servers 110.

Hypervisor 100 also includes a VDSA 160. In accordance with an embodiment of the present invention, a VDSA 160 runs on a separate virtual server within each physical hypervisor. VDSA 160 is a dedicated virtual server that provides data services via one or more data services engines 170. However, VDSA 160 does not reside in the actual I/O data path between I/O backend 130 and physical disk 140. Instead, VDSA 160 resides in a virtual I/O data path.

Whenever a virtual server 110 performs I/O on a virtual disk 120, tapping driver 150 identifies the I/O requests that the virtual server makes. Tapping driver 150 copies the I/O requests, forwards one copy via the conventional path to I/O backend 130, and forwards another copy to VDSA 160. In turn, VDSA 160 enables the one or more data services engines 170 to provide data services based on these I/O requests.

Figure 2:
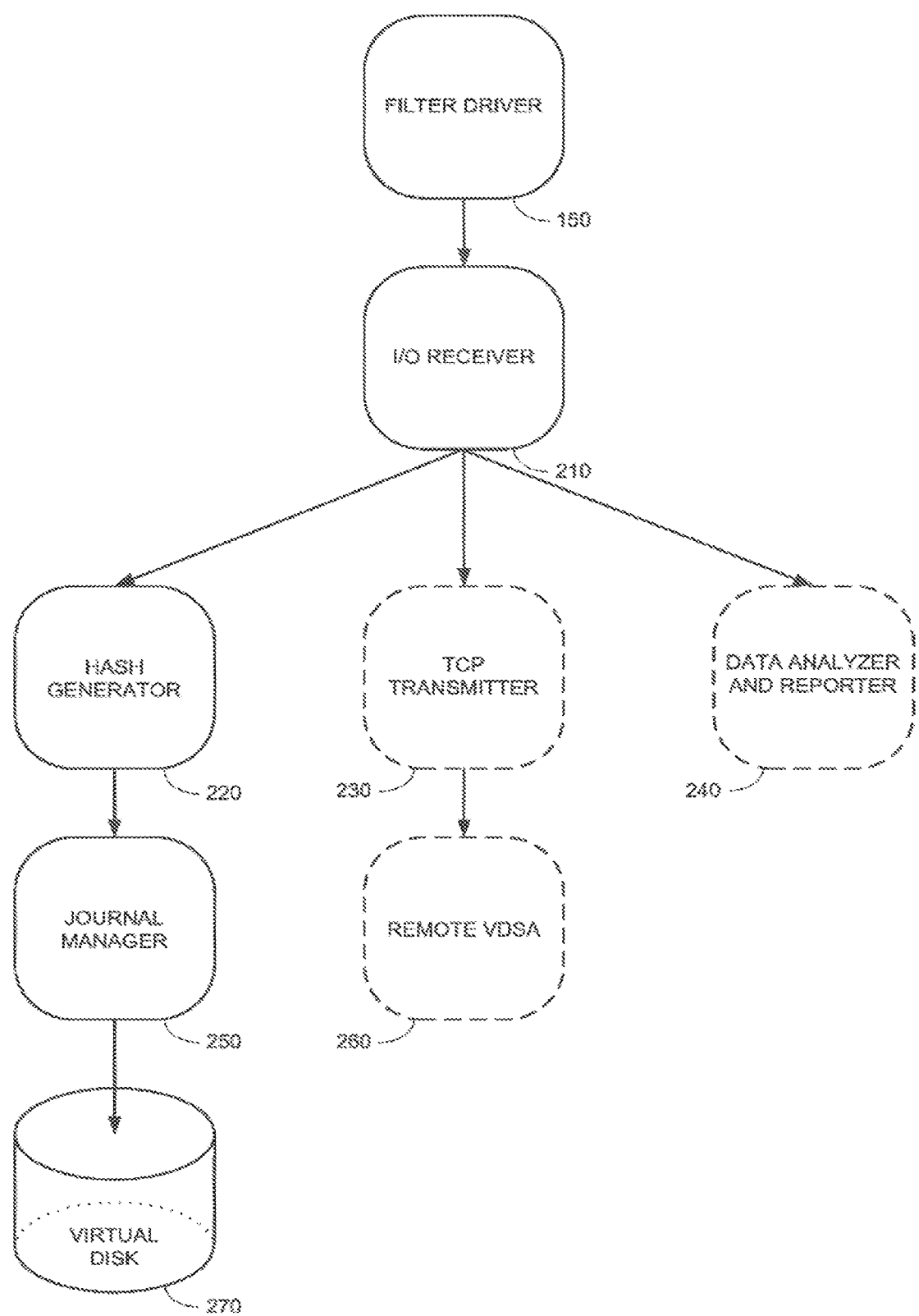
FIG. 2 is a simplified data flow chart for a virtual data services appliance, in accordance with an embodiment of the present invention.

Reference is made to FIG. 2, which is a simplified data flow chart for a VDSA, in accordance with an embodiment of the present invention. Shown in FIG. 2 are an I/O receiver 210, a hash generator 220, a TCP transmitter 230, a data analyzer and reporter 240, a journal manager 250 and a remote VDSA 260. Remote VDSA 260 resides on different physical hardware, at a possibly different location.

As shown in FIG. 2, I/O receiver 210 receives an intercepted I/O request from tapping driver 150. VDSA 160 makes up to three copies of the received I/O requests, in order to perform a set of actions which enable the one or more data services engines 170 to provide various services.

A first copy is stored in persistent storage, and used to provide continuous data protection. Specifically, VDSA 160 sends the first copy to journal manager 250, for storage in a dedicated virtual disk 270. Since all I/O requests are journaled on virtual disk 270, journal manager 250 provides recovery data services for virtual servers 110, such as restoring virtual servers 110 to an historical image. In order to conserve disk space, hash generator 220 derives a one-way hash from the I/O requests. Use of a hash ensures that only a single copy of any I/O request data is stored on disk.

An optional second copy is used for disaster recovery. It is sent via TCP transmitter 230 to remote VDSA 260. As such, access to all data is ensured even when the production hardware is not available, thus enabling disaster recovery data services.

An optional third copy is sent to data analyzer and reporter 240, which generates a report with information about the content of the data. Data analyzer and reporter 240 analyzes data content of the I/O requests and infers information regarding the data state of virtual servers 110. E.g., data analyzer and reporter 240 may infer the operating system level and the status of a virtual server 110.

Figure 3:
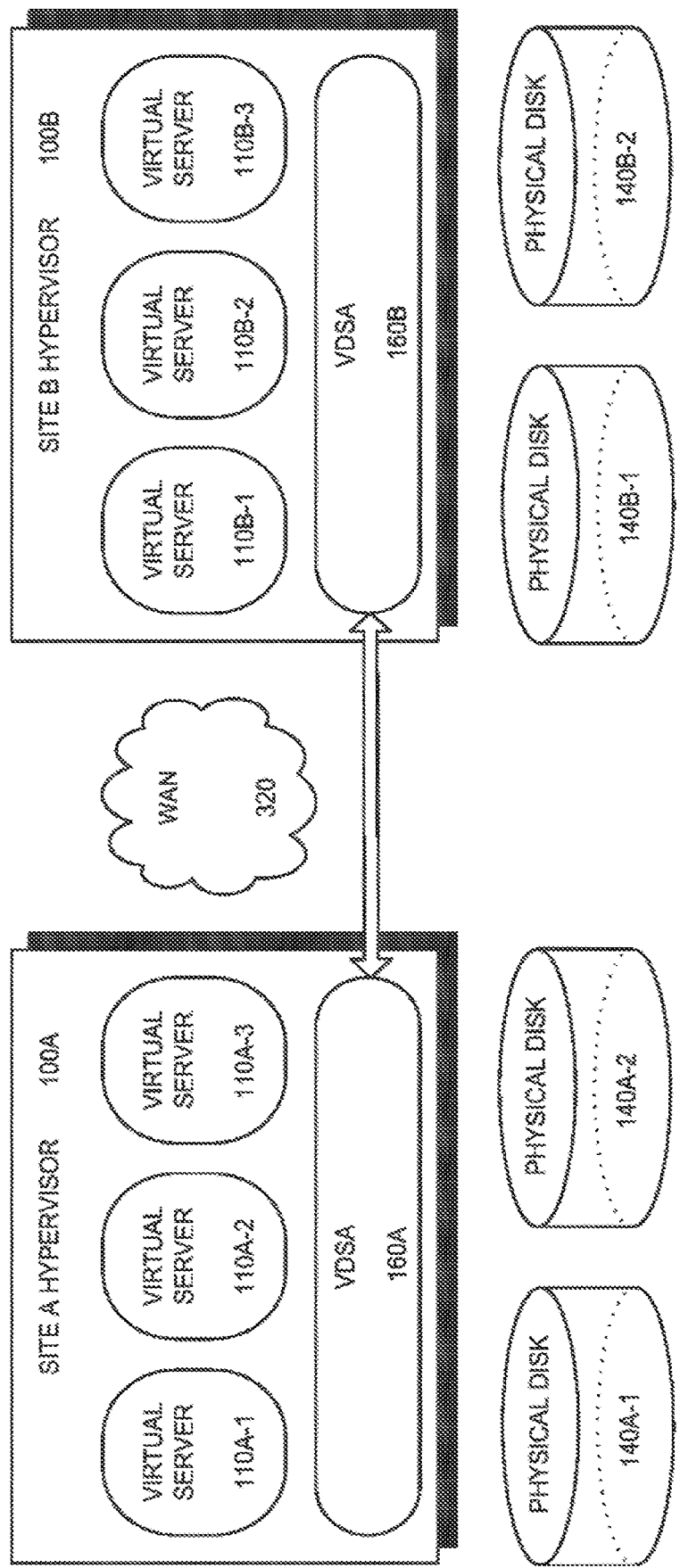
FIG. 3 is a simplified block diagram of a virtual replication system, in accordance with an embodiment of the present invention.

Reference is made to FIG. 3, which is a simplified block diagram of a virtual replication system, in accordance with an embodiment of the present invention. Shown in FIG. 3 is a protected site designated Site A, and a recovery site designated Site B. Site A includes a hypervisor 100A with three virtual servers 110-, 110A-2 and 110A-3, and a VDSA 160A. Site A includes two physical disks 140A-1 and 140A-2. Site B includes a hypervisor 100B with a VDSA 160B. Site B includes two physical disks 140B-1 and 140B-2. All or some of virtual servers 110A-1, 110A-2 and 110A-3 may be designated as protected. Once a virtual server is designated as protected, all changes made on the virtual server are replicated at the recovery site.

In accordance with an embodiment of the present invention, every write command from a protected virtual server in hypervisor 100A is intercepted by tapping driver 150 (FIG. 1) and sent asynchronously by VDSA 160A to VDSA 160B for replication, via a wide area network (WAN) 320, while the write command continues to be processed by the protected server.

At Site B, the write command is passed to a journal manager 250 (FIG. 2), for journaling on a Site B virtual disk 270 (FIG. 2). After every few seconds, a checkpoint is written to the Site B journal, and during a recovery one of the checkpoints may be selected for recovering to that point. Additionally, checkpoints may be manually added to the Site B journal by an administrator, along with a description of the checkpoint. E.g., a checkpoint may be added immediately prior to an event taking place that may result in the need to perform a recovery, such as a planned switch over to an emergency generator.

In addition to write commands being written to the Site B journal, mirrors 110B-1, 110B-2 and 110B-3 of the respective protected virtual servers 110A-1, 110A-2 and 110A-3 at Site A are created at Site B. The mirrors at Site B are updated at each checkpoint, so that they are mirrors of the corresponding virtual servers at Site A at the point of the last checkpoint. During a failover, an administrator can specify that he wants to recover the virtual servers using the latest data sent from the Site A. Alternatively the administrator can specify an earlier checkpoint, in which case the mirrors on the virtual servers 110B-1, 110-B-2 and 110B-3 are rolled back to the earlier checkpoint, and then the virtual servers are recovered to Site B. As such, the administrator can recover the environment to the point before any corruption, such as a crash or a virus, occurred, and ignore the write commands in the journal that were corrupted.

VDSAs 160A and 160B ensure write order fidelity; i.e., data at Site B is maintained in the same sequence as it was written at Site A. Write commands are kept in sequence by assigning a timestamp or a sequence number to each write at Site A. The write commands are sequenced at Site A, then transmitted to Site B asynchronously, then reordered at Site B to the proper time sequence, and then written to the Site B journal.

The journal file is cyclic; i.e., after a pre-designated time period, the earliest entries in the journal are overwritten by the newest entries.

It will be appreciated by those skilled in the art that the virtual replication appliance of the present invention operates at the hypervisor level, and thus obviates the need to consider physical disks. In distinction, conventional replication systems operate at the physical disk level. Embodiments of the present invention recover write commands at the application level. Conventional replication systems recover write commands at the SCSI level. As such, conventional replication systems are not fully application-aware, whereas embodiment of the present invention are full application-aware, and replicate write commands from an application in a consistent manner.

The present invention offers many advantages.

Hardware Agnostic: Because VDSA 160 manages recovery of virtual servers and virtual disks, it is not tied to specific hardware that is used at the protected site or at the recovery site. The hardware may be from the same vendor, or from different vendors. As long as the storage device supports the iSCSI protocol, any storage device, known today or to be developed in the future, can be used.

Fully Scalable: Because VDSA 160 resides in the hypervisor level, architectures of the present invention scale to multiple sites having multiple hypervisors, as described hereinbelow with reference to FIG. 4.

Efficient Asynchronous Replication: Write commands are captured by VDSA 160 before they are written to a physical disk at the protected site. The write commands are sent to the recovery site asynchronously, and thus avoid long distance replication latency. Moreover, only delta changes are sent to the recovery site, and not a whole file or disk, which reduces the network traffic, thereby reducing WAN requirements and improving recovery time objective and recovery point objective.

Control of Recovery: An administrator controls when a recovery is initiated, and to what point in time it recovers.

Near-Zero Recovery Point Objective (RPO): VDSA 160 continuously protects data, sending a record of every write command transacted at the protected site to the recovery site. As such, recovery may be performed within a requested RPO.

Near-Zero Recovery Time Objective (RTO): During recovery the mirrors of the protected virtual servers are recovered at the recovery site from VDSA 160B, and synchronized to a requested checkpoint. In accordance with an embodiment of the present invention, during synchronization and while the virtual servers at the recovery site are not yet fully synchronized, users can nevertheless access the virtual servers at the recovery site. Each user request to a virtual server is analyzed, and a response is returned either from the virtual server directly, or from the journal if the information in the journal is more up-to-date. Such analysis of user requests continues until the recovery site virtual environment is fully synchronized.

WAN Optimization between Protected and Recovery Sites: In accordance with an embodiment of the present invention, write commands re compressed before being sent from VDSA 160A to VDSA 160B, with throttling used to prioritize network traffic. As such, communication between the protected site and the recovery site is optimized.

WAN Failover Resilience: In accordance with an embodiment of the present invention, data is cached prior to being transmitted to the recovery site. If WAN 320 goes down, the cached data is saved and, as soon as WAN 320 comes up again, the data is sent to the recovery site and both sites are re-synchronized.

Single Point of Control: In accordance with an embodiment of the present invention, both the protected and the recovery site are managed from the same client console.

Secure Multi-Tenant Solution on Shared Hardware: The present invention enables multiple enterprises to use shared hardware at a recovery site for data replication, while maintaining security between the enterprises, as described hereinbelow with reference to FIGS. 9 and 10.

Figure 4:
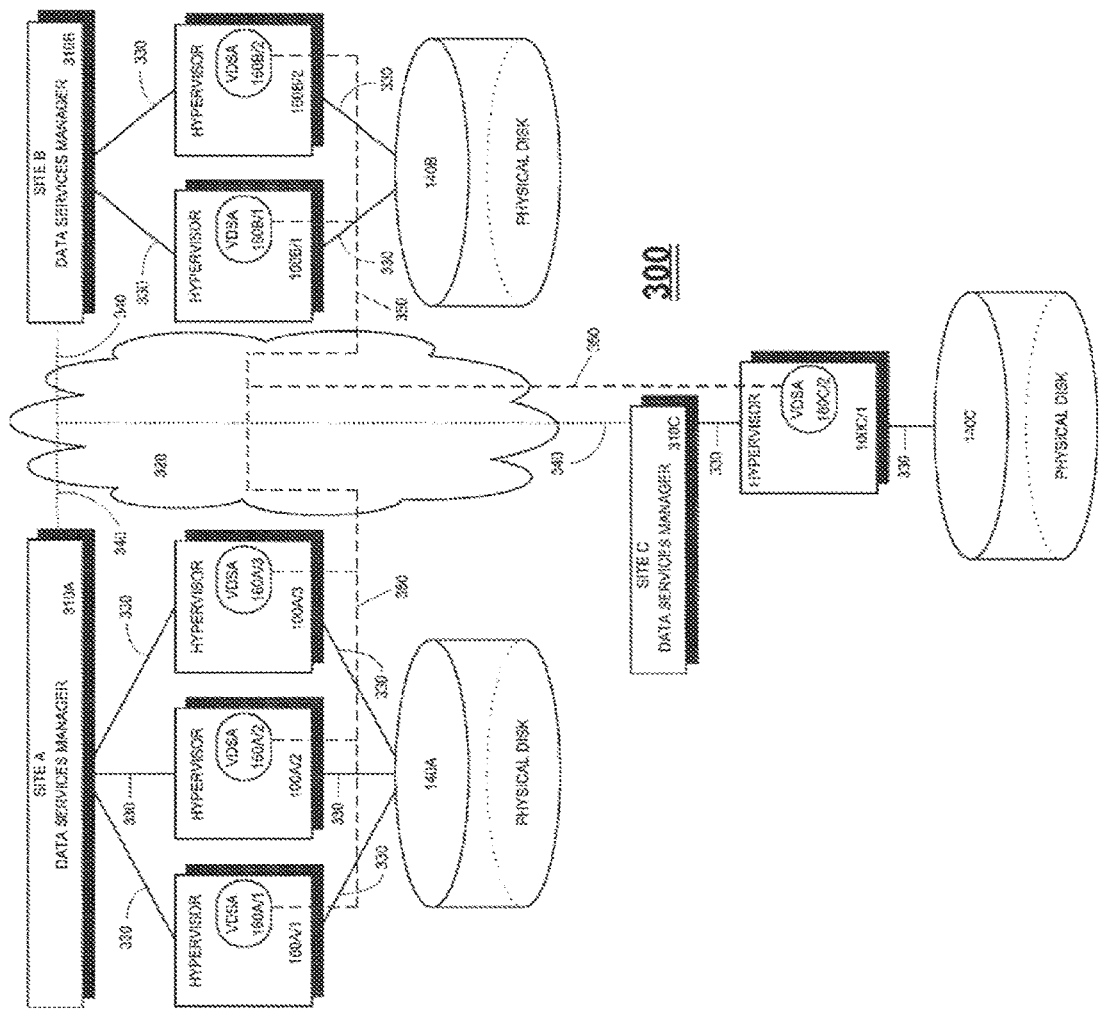
FIG. 4 is a simplified block diagram of a cross-host multiple hypervisor system that includes data services managers for multiple sites that have multiple hypervisors, in accordance with an embodiment of the present invention.

As indicated hereinabove, the architecture of FIG. 1 scales to multiple sites having multiple hypervisors. Reference is made to FIG. 4, which is a simplified block diagram of a cross-host multiple hypervisor system 300 that includes data services managers for multiple sites that have multiple hypervisors, in accordance with an embodiment of the present invention. The architecture of FIG. 4 includes three sites, designated Site A, Site B and Site C, the three sites being communicatively coupled via a network 320. Each site includes one or more hypervisors 100. Specifically, Site A includes three hypervisors, 100A/1, 100A/2 and 100A/3, Site B includes two hypervisors, 100B/1 and 100B/2, and Site C includes one hypervisor 100C/1. The sites have respective one or more physical disks 140A, 140B and 140C.

Figure 7:
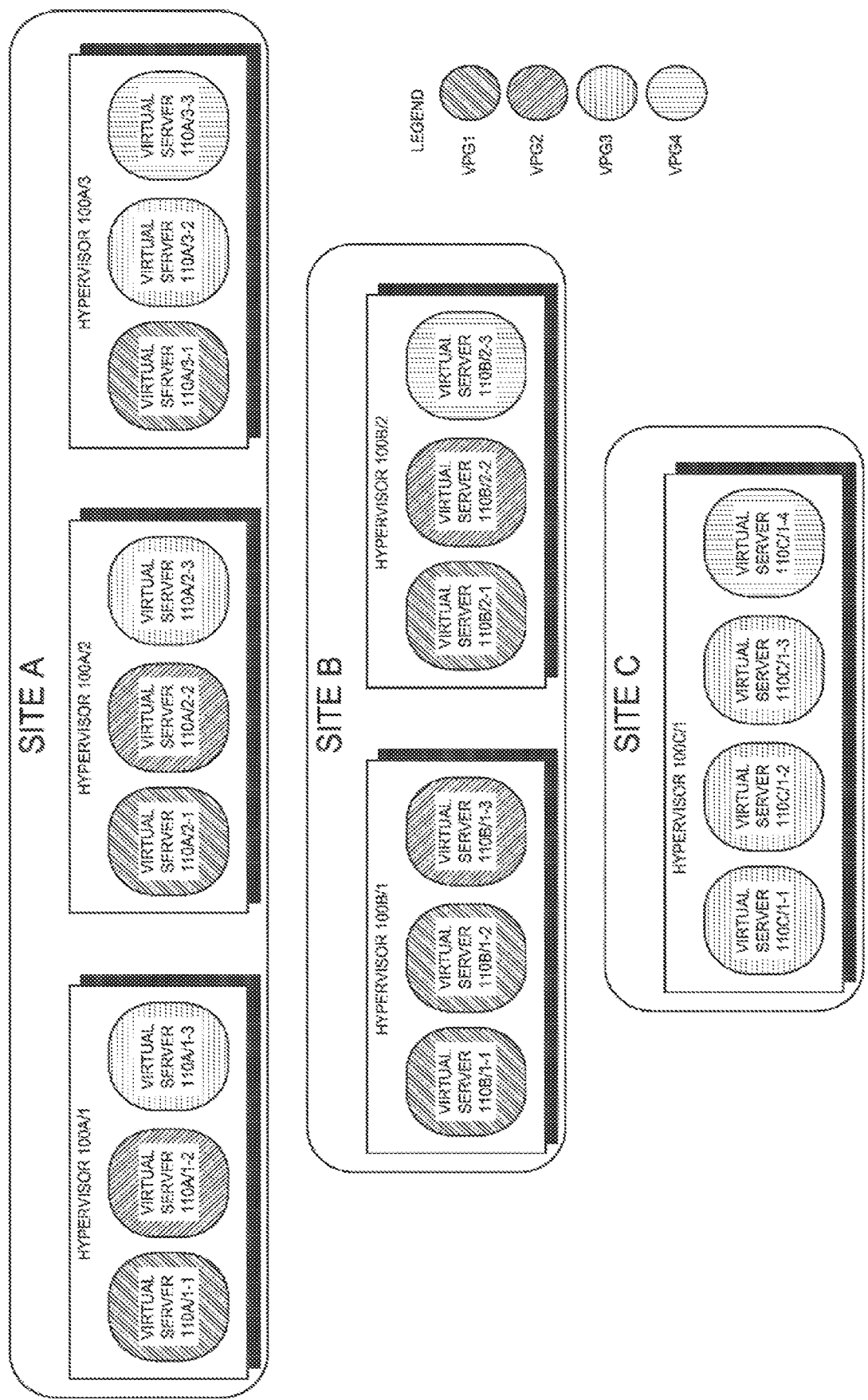
FIG. 7 is an example an environment for the system of FIG. 4, in accordance with an embodiment of the present invention.

The hypervisors are shown in system 300 with their respective VDSA's 160A/1, 160A/2, . . . , and the other components of the hypervisors, such as the virtual servers 110 and virtual disks 120, are not shown for the sake of clarity. An example system with virtual servers 110 is shown in FIG. 7, and described hereinbelow.

The sites include respective data services managers 310A, 310B and 310C that coordinate hypervisors in the sites, and coordinate hypervisors across the sites.

The system of FIG. 4 may be used for data replication, whereby data at one site is replicated at one or more other sites, for protection. The solid communication lines 330 in FIG. 4 are used for in-site traffic, the dashed communication lines 340 are used for replication traffic between sites, and the dotted communication lines 350 are used for control traffic between data services managers.

Data services managers 310A, 310B and 310C are control elements. The data services managers at each site communicate with one another to coordinate state and instructions. The data services managers track the hypervisors in the environment, and track health and status of the VDSAs 160A/1, 160A/2, . . . .

It will be appreciated by those skilled in the art that the environment shown in FIG. 4 may be re-configured by moving one or more virtual servers 110 from one hypervisor 100 to another, by moving one or more virtual disks 120 from one hypervisor 100 to another, and by adding one or more additional virtual servers 110 to a hypervisor 100.

In accordance with an embodiment of the present invention, the data services managers enable designating groups of specific virtual servers 110, referred to as virtual protection groups, to be protected. For virtual protection groups, write order fidelity is maintained. The data services managers enable designating a replication target for each virtual protection group; i.e., one or more sites, and one or more hypervisors in the one or more sites, at which the virtual protection group is replicated. A virtual protection group may have more than one replication target. The number of hypervisors and virtual servers within a virtual protection group and its replication target are not required to be the same.

Figure 5:
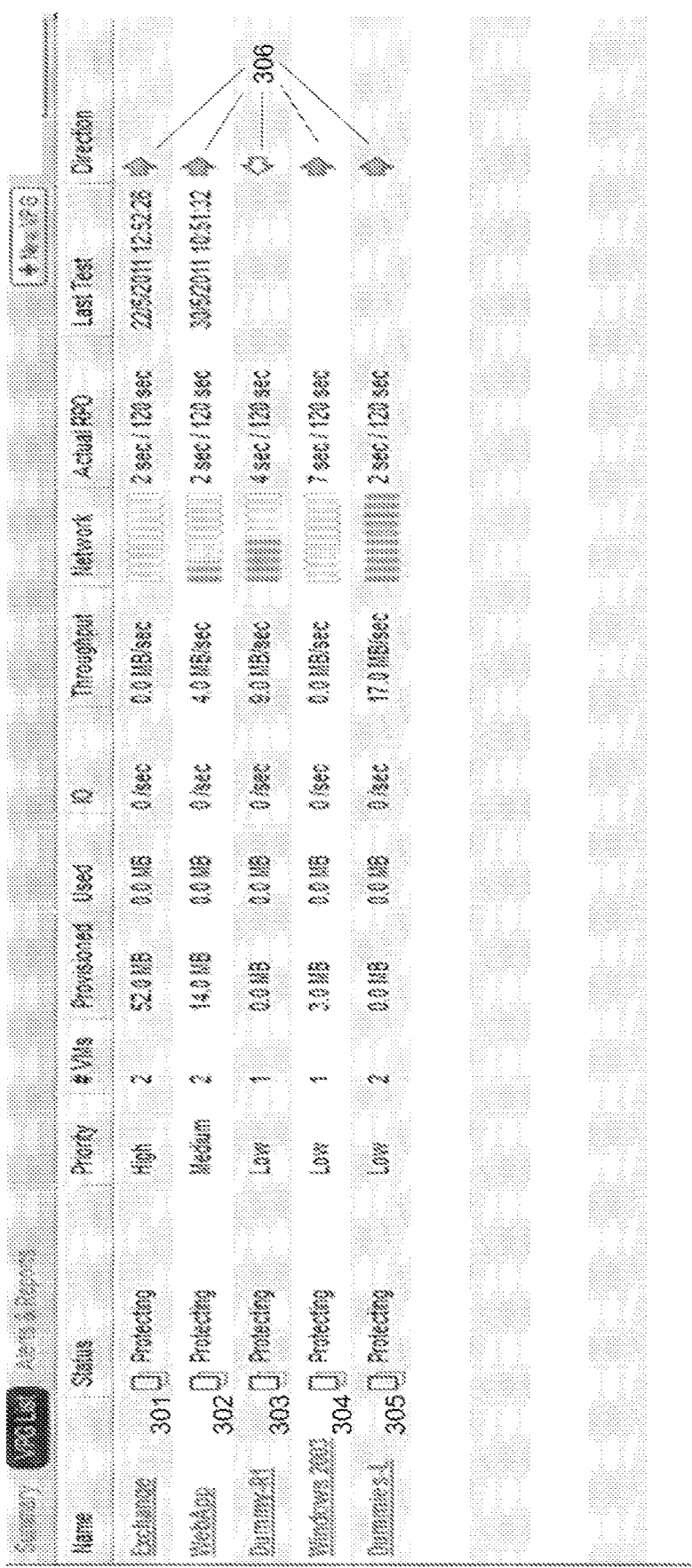
FIG. 5 is a user interface screenshot of bi-directional replication of virtual protection groups, in accordance with an embodiment of the present invention.

Reference is made to FIG. 5, which is a user interface screenshot of bi-directional replication of virtual protection groups, in accordance with an embodiment of the present invention. Shown in FIG. 4 are virtual protection groups 301 ("Exchange"), 302 ("WebApp"), 303 ("Dummy-R1"), 304 ("Windows 2003") and 305 (Dummies-L"). Arrows 306 indicate direction of replication.

Figure 6:
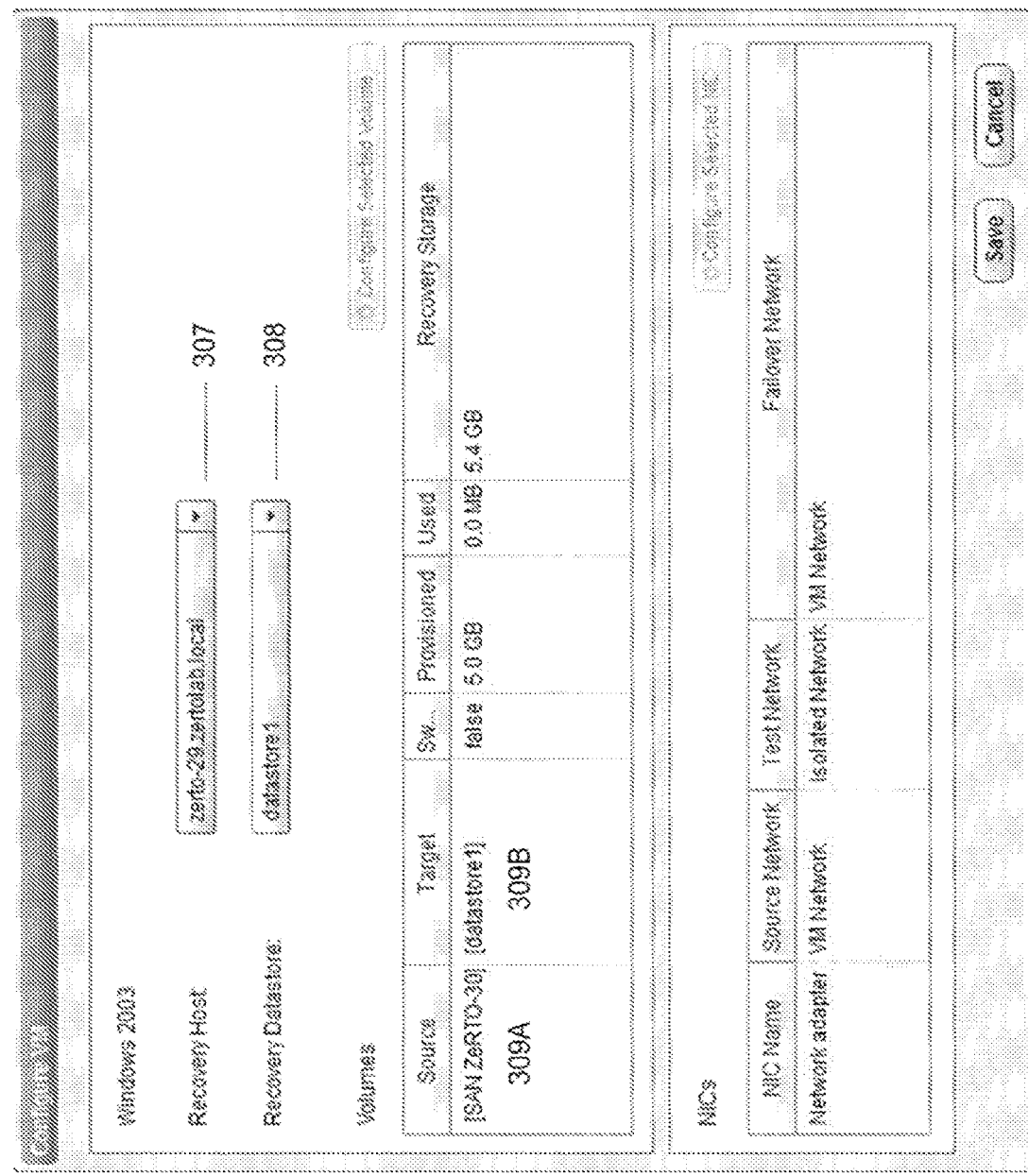
FIG. 6 is a user interface screenshot of assignment of a replication target for a virtual protection group, in accordance with an embodiment of the present invention.

Reference is made to FIG. 6, which is a user interface screenshot of assignment of a replication target for a virtual protection group, in accordance with an embodiment of the present invention. Shown in FIG. 6 is an entry 307 for designating a recovery host, and an entry 308 for designating a recovery datastore for virtual protection group 304 ("Windows 2003") of FIG. 5. Respective source and target datastores, [SAN ZeRTO-30] 309A and [datastore1] 309B, are shown as being paired.

More generally, the recovery host may be assigned to a cluster, instead of to a single hypervisor, and the recovery datastore may be assigned to a pool of resources, instead of to a single datastore. Such assignments are of particular advantage when different enterprises share the same physical infrastructure for target replication, as such assignments mask the virtual infrastructure between the different enterprises.

The data services managers synchronize site topology information. As such, a target site's hypervisors and datastores may be configured from a source site.

Virtual protection groups enable protection of applications that run on multiple virtual servers and disks as a single unit. E.g., an application that runs on virtual servers many require a web server and a database, each of which run on a different virtual server than the virtual server that runs the application. These virtual servers may be bundled together using a virtual protection group.

Referring back to FIG. 4, data services managers 310A, 310B and 310C monitor changes in the environment, and automatically update virtual protection group settings accordingly. Such changes in the environment include inter alia moving a virtual server 110 from one hypervisor 100 to another, moving a virtual disk 120 from one hypervisor 100 to another, and adding a virtual server 110 to a hypervisor 100.

For each virtual server 110 and its target host, each VDSA 160A/1, 160A/2, . . . replicates IOs to its corresponding replication target. The VDSA can replicate all virtual servers to the same hypervisor, or to different hypervisors. Each VDSA maintains write order fidelity for the IOs passing through it, and the data services manager coordinates the writes among the VDSAs.

Since the replication target hypervisor for each virtual server 110 in a virtual protection group may be specified arbitrarily, all virtual servers 110 in the virtual protection group may be replicated at a single hypervisor, or at multiple hypervisors. Moreover, the virtual servers 110 in the source site may migrate across hosts during replication, and the data services manager tracks the migration and accounts for it seamlessly.

Reference is made to FIG. 7, which is an example an environment for system 300, in accordance with an embodiment of the present invention. As shown in FIG. 7, system 300 includes the following components.

Site A
Hypervisor 100A/1: virtual servers 110A/1-1, 110A/1-2, 110A/1-3.
Hypervisor 100A/2: virtual servers 110A/2-1, 110A/2-2, 110A/2-3.
Hypervisor 100A/3: virtual servers 110A/3-1, 110A/3-2, 110A/3-3.
Site B
Hypervisor 100B/1: virtual servers 110B/1-1, 110B/1-2, 110B/1-3.
Hypervisor 100B/2: virtual servers 110B/2-1, 110B/2-2, 110B/2-3.
Site C
Hypervisor 100C/1: virtual servers 110C/1-1, 110C/1-2, 110C/1-3, 110C/1-4.

As further shown in FIG. 7, system 300 includes the following virtual protection groups. Each virtual protection group is shown with a different hatching, for clarity.
VPG1 (Shown With Upward-Sloping Hatching)
    Source at Site A: virtual servers 110A/1-1, 110A/2-1, 110A/3-1
    Replication Target at Site B: virtual servers 110B/1-1, 110B/1-2, 110B/2-1
VPG2 (Shown With Downward-Sloping Hatching)
    Source at Site B: virtual servers 110B/1-3, 110B/2-2
    Replication Target at Site A: virtual servers 110A/1-2, 110A/2-2
VPG3 (Shown With Horizontal Hatching)
    Source at Site A: virtual server 110A/3-3
    Replication Target at Site B: virtual serer 110B/2-3
    Replication Target at Site C: virtual server 110C/1-4
VPG4 (Shown With Vertical Hatching)
    Source at Site A: virtual servers 110A/1-3, 110A/2-3, 110A/3-2
    Replication Target at Site C: virtual servers 110C/1-1, 110C/1-2, 110C/1-3

As such, it will be appreciated by those skilled in the art that the hypervisor architecture of FIG. 1 scales to multiple host sites, each of which hosts multiple hypervisors. The scaling flexibly allows for different numbers of hypervisors at different sites, and different numbers of virtual services and virtual disks within different hypervisors.

The scaling flexibility of the present invention also allows extension to cloud-based data services provided by a cloud provider on a shared infrastructure, as explained hereinbelow.

Cloud-based data services enable data center providers to service multiple enterprises at data centers that are remote from the enterprises. Cloud-based data services offer many advantages. Enterprises that use cloud-based data services obviate the needs for servers, SAN/NAS, networks, communication lines, installation, configuration and ongoing maintenance of information technology systems, and overhead expenses for electricity, cooling and space. However, conventional cloud-based data suffer from weakness of security due to multiple enterprises sharing the same physical infrastructure, and due to multiple enterprises using the same networks and IPs for their services.

Figure 8:
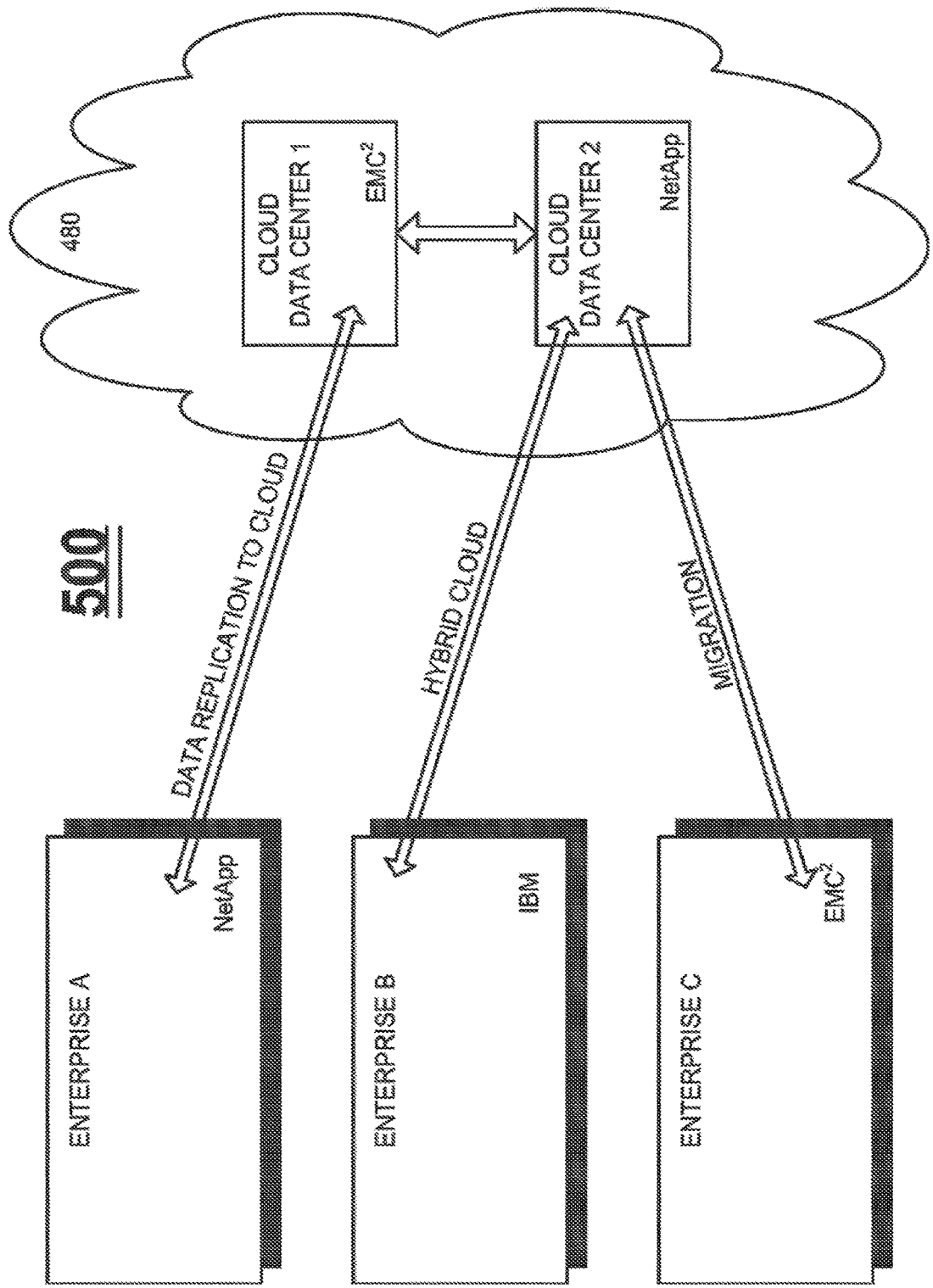
FIG. 8 is a simplified block diagram of a system for multi-tenant and multi-site cloud-based data services, in accordance with an embodiment of the present invention.

Cloud-based systems of the present invention overcome these weaknesses. Reference is made to FIG. 8, which is a simplified block diagram of a system 500 for multi-tenant and multi-site cloud-based data services, in accordance with an embodiment of the present invention. Shown in FIG. 8 are three enterprises, designated A, B and C, and a remote cloud-based facility 480 with two data centers, designated 1 and 2. Enterprise A uses a NETAPP® data management system, Enterprise B uses an IBM® data management system, and Enterprise C uses an EMC2® data management system. Data Center 1 uses an EMC2® data management system and services Enterprise A. Data Center 2 uses a NETAPP® data management system and services Enterprises B and C.

System 500 has many advantages over conventional data service systems. Inter alia, system 500 enables protection of heterogenic environments, enables remote control of enterprise sites, enables economies of scale, enables complete workload mobility, enables a complete web services API for seamless integration, and enables integration with other cloud-based management systems.

Figure 9:
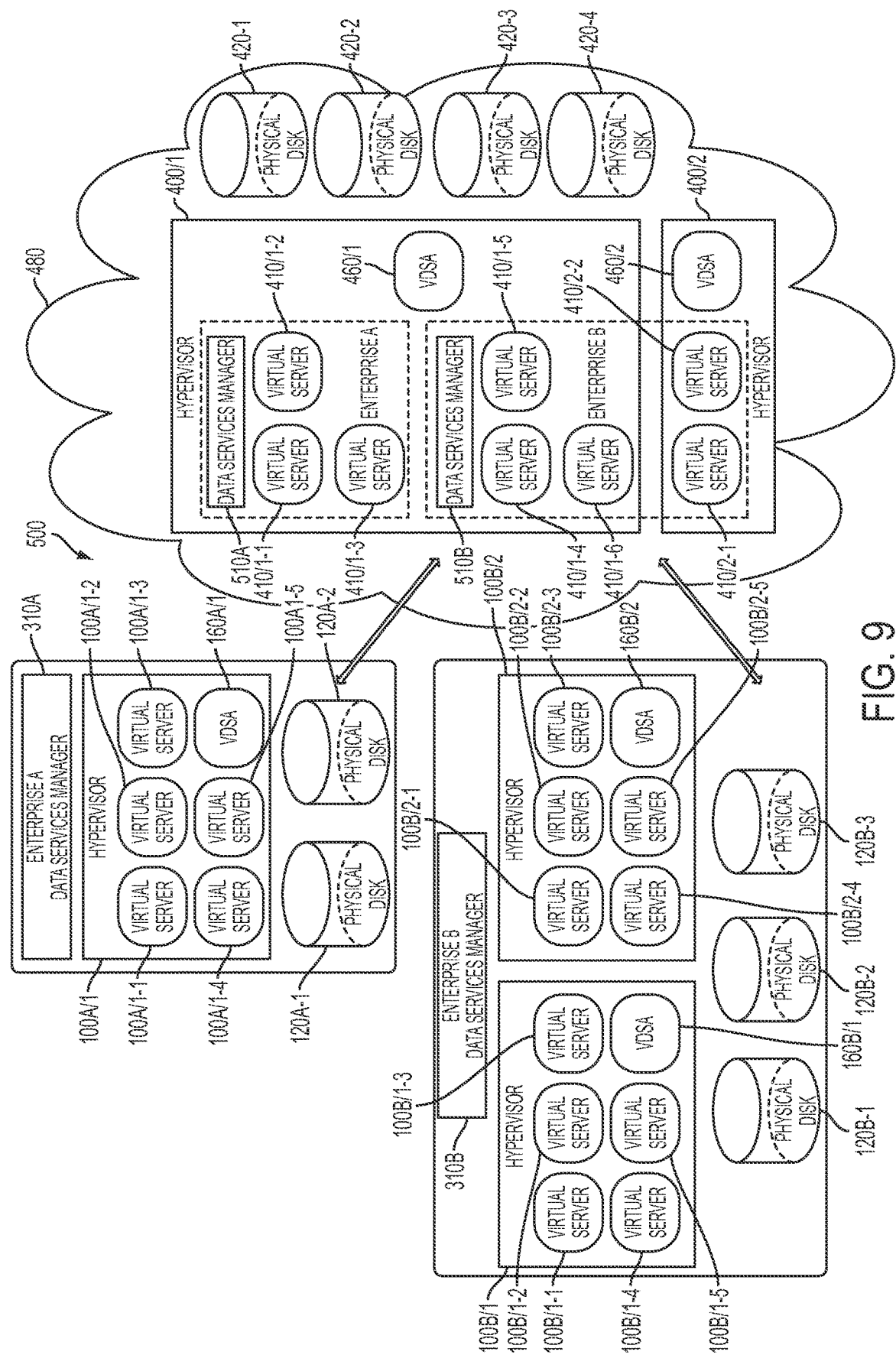
FIG. 9 is a simplified block diagram of a first configuration for providing hypervisor level multi-tenant cloud-based data services, in accordance with an embodiment of the present invention.

Reference is made to FIG. 9, which is a simplified block diagram of a first configuration of system 500 for providing hypervisor level multi-tenant cloud-based data services, in accordance with an embodiment of the present invention. The configuration shown in FIG. 9 includes two enterprises; namely, a smaller enterprise A and a larger enterprise B. Enterprise A infrastructure includes a single hypervisor 100A/1 with five virtual servers 100A/1-1, 100A/1-2, 100A/1-3, 100A/1-4 and 100A/1-5 and a VDSA 160A/1, includes two physical disks 120A-1 and 120A-2, and includes a data services manager 310A. Enterprise B infrastructure includes two hypervisors 100B/1 and 100B/2, includes three physical disks 120B-1, 120B-2 and 120B-3, and a data services manager 310B. Hypervisor 100B/1 includes five virtual servers 100B/1-1, 100B/1-2, 100B/1-3, 100B/1-4 and 100B/1-5 and a VDSA 160B/1; and hypervisor 100B/2 includes five virtual servers 100B/2-1, 100B/2-2, 100B/2-3, 100B/2-4 and 100B/2-5 and a VDSA 160B/2.

Cloud-based facility 480 infrastructure includes two hypervisor 400/1 and 400/2, and four physical disks 420-1, 420-2, 420-3 and 420-4. Hypervisor 400/1 includes six virtual servers 410/1-1, 410/1-2, 410/1-3, 410/1-4, 410/1-5 and 410/1-6; and hypervisor 400/2 includes two virtual servers 410/2-1 and 410/2-2. Hypervisor 400/1 services Enterprises A and B, and hypervisor 400/2 services Enterprise B. As such, the infrastructure of cloud-based facility 480 is shared between Enterprises A and B.

The configuration of FIG. 9 allocates one data services manager per enterprise and one VDSA per hypervisor. Specifically, hypervisor 400/1 includes a VDSA 460/1 and hypervisor 400/2 includes a VDSA 460/2. A data services manager 510A services Enterprise A, and a data services manager 510B services Enterprise B.

Figure 10:
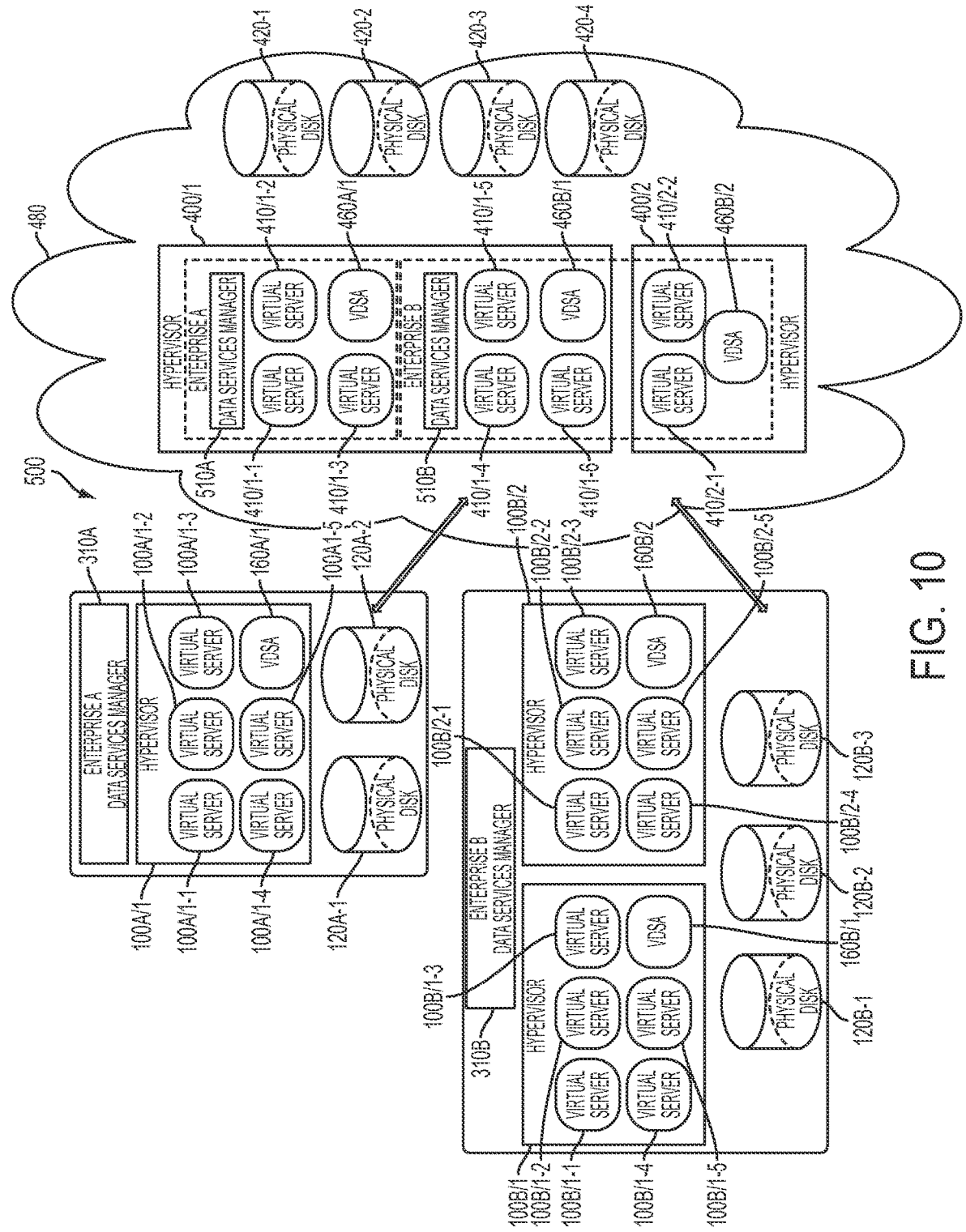
FIG. 10 is a simplified block diagram of a second configuration for providing hypervisor level multi-tenant cloud-based data services, in accordance with an embodiment of the present invention.

Reference is made to FIG. 10, which is a simplified block diagram of a second configuration of system 500 for providing hypervisor level multi-tenant cloud-based data services, in accordance with an embodiment of the present invention. The configuration of FIG. 10 allocates one data services manager per enterprise and one VDSA per enterprise per hypervisor. Specifically, hypervisor 400/1 includes a VDSA 460A/1 for Enterprise A and a VDSA 460B/1 for Enterprise B, and hypervisor 400/2 includes a VDSA 460B/2 for Enterprise B.

The two different configurations shown in FIGS. 9 and 10 offer different advantages. The configuration of FIG. 9 minimizes the cloud footprint, by using only one data services manager per hypervisor, but offers less data path security for enterprises. Specifically, the infrastructure is shared between enterprises and security is enforced via software. The configuration of FIG. 10 maximizes data path security for enterprises, but the cloud footprint is larger, since multiple data services managers may be required per hypervisor.

As such, it will be appreciated by those skilled in the art that the cloud-based hypervisor level data services systems of the present invention enable multi-tenancy and multi-side services; i.e., multiple enterprises and multiple sites may be serviced by the same physical infrastructure including inter alia the same hypervisors and storage. By providing each enterprise with its own data services manager, as in FIGS. 9 and 10, the systems of the present invention provide path separation between enterprises, thus ensuring that each enterprise is only able to view and access his own virtual servers and storage, and each enterprise can only control its own data replication. The systems of the present invention may be installed behind network address translators (NATs), and do not require a virtual private network (VPN). As such, these systems may obviate VPN setups for enterprises, and obviate use of public IPs.

The systems of the present invention provide bi-directional cloud-based data replication services; i.e., from an enterprise to the cloud, and from the cloud to an enterprise, for the same enterprise or for different enterprises, simultaneously using the same shared infrastructure. Moreover, replication targets may be set as resources that do not expose the enterprise infrastructure, thus providing an additional layer of security and privacy between enterprises.

It will be appreciated by those skilled in the art that systems of the present invention may be used to enforce jurisdictional data export regulations. Specifically, cloud-based facility 480 infrastructure is partitioned according to jurisdictions, and data recovery and failover for an enterprise is limited to one or more specific partitions according to jurisdictional regulations.

Figure 11:
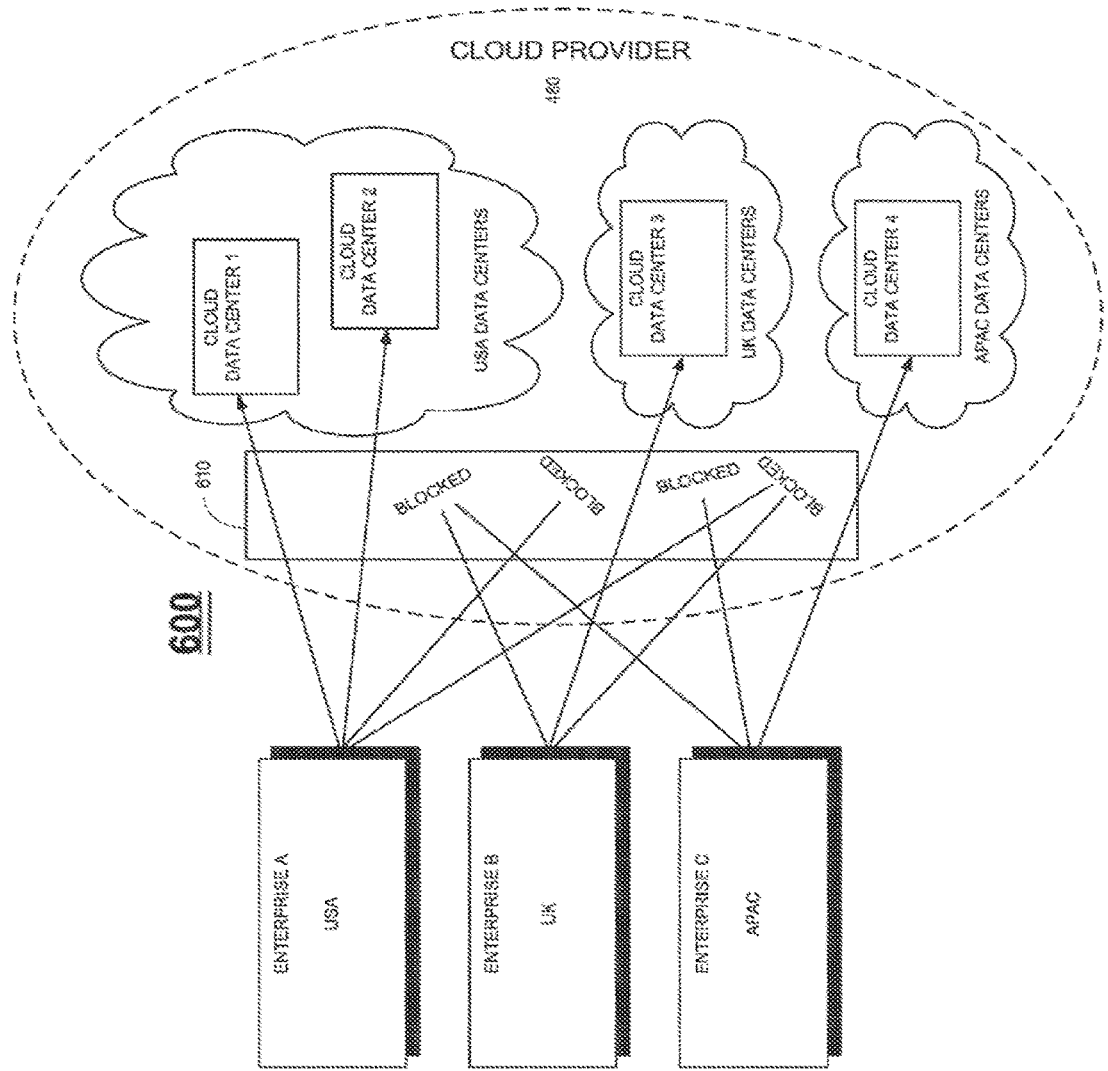
FIG. 11 is a simplified block diagram of a system for multi-tenant and multi-site cloud-based data services with jurisdictional data separation, in accordance with an embodiment of the present invention.

Reference is made to FIG. 11, which is a simplified block diagram of a system 600 for multi-tenant and multi-site cloud-based data services with jurisdictional data separation, in accordance with an embodiment of the present invention. Shown in FIG. 11 are three jurisdictional enterprises; namely, a USA Enterprise A, a UK Enterprise B, and an APAC Enterprise C. Also shown in FIG. 11 are four data centers; namely, Data Center 1 and Data Center 2 in the USA, Data Center 3 in the UK and Data Center 4 in APAC.

Export regulations prevent data from being exported from one jurisdiction to another. In order to enforce these regulations, system 600 includes a rights manager 610 that blocks access to a data center by an enterprise if data export is regulations restrict data transfer between their respective jurisdictions. Thus rights manager 610 blocks access by Enterprise A to Data Centers 3 and 4, blocks access by Enterprise B to Data Centers 1,2 and 4, and blocks access by Enterprise C to Data Centers 1, 2, and 3. Enterprises A, B and C may be commonly owned, but access of the data centers by the enterprises is nevertheless blocked, in order to comply with data export regulations.

In accordance with an embodiment of the present invention, when configuring a virtual protection group, an administrator may set a territory/data center restriction. When the administrator subsequently selects a destination resource for data replication for a virtual protection group, system 600 verifies that the resource is located in a geography that does not violate a territory/data center restriction.

The present invention may be implemented through an application programming interface (API), exposed as web service operations. Reference is made to Appendices I-V, which define an API for virtual replication web services, in accordance with an embodiment of the present invention.

It will thus be appreciated that the present invention provides many advantages, including inter alia:

heterogeneous hypervisor replication, for different types of sources and target hypervisor; e.g., from a VMWare hypervisor to a Xen hypervisor;

heterogeneous storage replication, for different types of storage systems; e.g., from an EMC storage system to a NetApp storage systems;

bi-directional replication, whereby one enterprise may replicate from the enterprise to a cloud data center, while another enterprise simultaneously replicates from a cloud data center back to the enterprise; and security, whereby the cloud infrastructure is not exposed.

In the foregoing specification, the invention has been described with reference to specific exemplary embodiments thereof. It will, however, be evident that various modifications and changes may be made to the specific exemplary embodiments without departing from the broader spirit and scope of the invention as set forth in the appended claims. Accordingly, the specification and drawings are to be regarded in an illustrative rather than a restrictive sense.

What is claimed is:

1. A system for cloud-based data services for enterprise management, comprising:
   a first cloud hypervisor comprising a first virtual data services appliance that provides cloud-based services to a first enterprise;
   a second cloud hypervisor comprising a second virtual data services appliance that provides cloud-based services to a second enterprise;
   a first data services manager associated with the first enterprise that tracks a first status of the first virtual data services appliance of the first cloud hypervisor;
   a second data services manager associated with the second enterprise that tracks a second status of the second virtual data services appliance of the second cloud hypervisor;
   the first data services manager communicates with the second data services manager to coordinate the first status of the first virtual data services appliance and the second status of the second virtual data services appliance across the first cloud hypervisor and the second cloud hypervisor in providing the cloud-based services to the first enterprise and the second enterprise; and
   the first data services manager and the second data services manager enable a plurality of virtual protection groups to designate a replication target for each virtual protection group of the plurality of virtual protection groups.

2. The system of claim 1, wherein the first enterprise for the first cloud hypervisor comprises the first data services manager and the second enterprise for the second cloud hypervisor comprises the second data services manager.

3. The system of claim 1, wherein the first cloud hypervisor resides at a first site and the second cloud hypervisor resides at a second site.

4. The system of claim 1, wherein the first cloud hypervisor and the second cloud hypervisor resides at a same site.

5. The system of claim 1, wherein the first cloud hypervisor comprises a first virtual server.

6. The system of claim 1, comprising:
   a tapping driver that intercepts an I/O request, wherein the first virtual data services appliance receives the I/O request from the tapping driver.

7. The system of claim 1, comprising a rights manager that restricts the first cloud hypervisor from accessing data not associated with the first cloud hypervisor.

8. The system of claim 1, wherein the first data services manager communicates one or more instructions for the second virtual data services appliance with the second data services manager.

9. The system of claim 1, wherein the first data services manager designates a first virtual server as belonging to a virtual protection group of the plurality of virtual protection groups.

10. The system of claim 1, wherein the first virtual data services appliance determines a data state of the first virtual data services appliance based on data content of an I/O request.

11. The system of claim 1, wherein the first data services manager enables data recovery from a virtual protection group.

12. The system of claim 1, comprising:
   a journal manager associated with the first cloud hypervisor that stores a copy of data associated with the first virtual data services appliance.

13. The system of claim 1, comprising:
   a rights manager that restricts access of the second cloud hypervisor by the first cloud hypervisor, responsive to a determination that there is a data export restriction between the first cloud hypervisor and the second cloud hypervisor.

14. A method of managing cloud-based data services for enterprises, comprising:
   tracking, by a first data services manager associated with a first enterprise for a first cloud hypervisor comprising a first virtual data services appliance that provides cloud-based services to the first enterprise, a first status of the first virtual data services appliance of the first cloud hypervisor associated with the first enterprise;
   tracking, by a second data services manager associated with a second enterprise for a second cloud hypervisor comprising a second virtual data services appliance that provides cloud-based services to the second enterprise, a second status of the second virtual data services appliance associated with the second enterprise; and
   communicating, by the first data services manager, with the second data services manager, to coordinate the first status of the first virtual data services appliance and the second status of the second virtual data services appliance across the first cloud hypervisor and the second cloud hypervisor in providing the cloud-based services to the first enterprise and the second enterprise, the first data services manager and the second data services manager to enable a plurality of virtual protection groups to designate a replication target for each virtual protection group of the plurality of virtual protection groups.

15. The method of claim 14, comprising:
   intercepting, by a tapping driver associated with the first cloud hypervisor, an I/O request; and
   receiving, by the first virtual data services appliance, the I/O request from the tapping driver.

16. The method of claim 14, comprising:
   communicating, by the first virtual data services appliance, with one or more instructions for the second virtual data services appliance.

17. The method of claim 14, comprising:
   designating, by the first data services manager, a first virtual server as belonging to a virtual protection group of the plurality of virtual protection groups specifying write/order permissions; and
   providing, by the first data services manager, data recovery for the virtual protection group.

18. The method of claim 14, comprising:
   restricting, by a rights manager, access of the second cloud hypervisor by the first cloud hypervisor, responsive to determining that there is a data export restriction between the first cloud hypervisor and the second cloud hypervisor.

19. The method of claim 14, comprising:
determining, by the first virtual data services appliance, a data state of the first virtual data services appliance based on a data content of an I/O request.

* * * * *